(12) United States Patent
Wilkinson et al.

(10) Patent No.: US 8,432,258 B2
(45) Date of Patent: Apr. 30, 2013

(54) APPARATUS AND METHOD FACILITATING COMMUNICATION BETWEEN COMPONENTS OF A RADIO FREQUENCY IDENTIFICATION SYSTEM

(75) Inventors: Bruce W. Wilkinson, Rogers, AR (US); Richard B. Ulrich, Bentonville, AR (US); Nicholaus A. Jones, Fayetteville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 665 days.

(21) Appl. No.: 12/538,069

(22) Filed: Aug. 7, 2009

(65) Prior Publication Data

US 2010/0123559 A1 May 20, 2010

Related U.S. Application Data

(60) Provisional application No. 61/086,925, filed on Aug. 7, 2008.

(51) Int. Cl.
*H04Q 5/22* (2006.01)

(52) U.S. Cl.
USPC .................................. 340/10.4; 340/425.1

(58) Field of Classification Search .................. 340/10.4
See application file for complete search history.

(56) References Cited

U.S. PATENT DOCUMENTS

| | | | |
|---|---|---|---|
| 5,835,848 A * | 11/1998 | Bi et al. | 455/24 |
| 6,037,845 A * | 3/2000 | Parker | 333/128 |
| 6,677,852 B1 * | 1/2004 | Landt | 340/10.1 |
| 7,049,933 B1 * | 5/2006 | Koerner | 340/10.1 |
| 7,232,069 B1 * | 6/2007 | White | 235/451 |
| 7,317,379 B2 | 1/2008 | Kimura | |
| 7,439,863 B2 | 10/2008 | Suzuki et al. | |
| 7,586,416 B2 | 9/2009 | Ariyoshi et al. | |
| 7,920,062 B1 * | 4/2011 | Konstad et al. | 340/568.5 |
| 2002/0170961 A1 * | 11/2002 | Dickson et al. | 235/383 |
| 2004/0110469 A1 * | 6/2004 | Judd et al. | 455/15 |
| 2006/0052066 A1 | 3/2006 | Cleveland et al. | |
| 2006/0208899 A1 * | 9/2006 | Suzuki et al. | 340/572.7 |
| 2006/0220870 A1 * | 10/2006 | Kimura | 340/572.7 |

(Continued)

FOREIGN PATENT DOCUMENTS

| | | |
|---|---|---|
| EP | 1 071 160 A2 | 1/2001 |
| JP | 2528386 | 12/1996 |
| JP | 2004-94532 | 3/2004 |
| JP | 2006-262313 A | 9/2006 |

OTHER PUBLICATIONS

Linear Technology RF Power Controllers Data Sheet (Linear Technology; Linear Technology LTC 1757A-1/LTC 1757A-2 Single/Dual Band RF Power Controllers Data Sheet, 2000).*

(Continued)

*Primary Examiner* — Daniel Wu
*Assistant Examiner* — Frederick Ott
(74) *Attorney, Agent, or Firm* — Fitch, Even, Tabin & Flannery LLP

(57) ABSTRACT

Several embodiments provide methods and apparatus to improve communications between an RFID reader and one or more RFID tags. In one implementation, an apparatus comprises a first antenna configured to communicate with a radio frequency identification (RFID) reader; a second antenna separate from said first antenna, and configured to communicate with at least one RFID tag; and structure electrically coupling said first and second antennas.

37 Claims, 24 Drawing Sheets

U.S. PATENT DOCUMENTS

| | | | |
|---|---|---|---|
| 2007/0001809 A1 | 1/2007 | Kodukula et al. | |
| 2007/0095911 A1* | 5/2007 | Shimura et al. | 235/440 |
| 2007/0171073 A1 | 7/2007 | Ariyoshi et al. | |
| 2008/0018469 A1* | 1/2008 | Volpi et al. | 340/572.1 |
| 2008/0157968 A1 | 7/2008 | Cunningham et al. | |
| 2009/0085738 A1* | 4/2009 | Darianian et al. | 340/539.11 |

OTHER PUBLICATIONS

Harris AN/PRC-117F(C) Applications Handbook (Harris AN/PRC-117F(C) Multiband Multimission Radio Applications Handbook, AP2005-2A, May 2007).*

PCT; App. No. PCT/US2009/053226; International Search Report mailed Jan. 29, 2010.

PCT; App. No. PCT/US2009/053226; Written Opinion mailed Jan. 29, 2010.

Nikitin et al.; *An Overview of Near Field UHF RFID*; Feb. 2007; 8 pages; IEEE.

RFIDSoup.com; *RFID Soup*; Mar. 6, 2009; 12 pages; published at http://rfidsoup.pbwiki.com.

Tagsense.com, *TagSene Frequently Asked Questions*; Mar. 6, 2009; 3 pages; published at www.tagsense.com/ingles/faq/faq.html.

Technovelgy.com; *Passive RFID Tag (or Passive Tag)*; Mar. 5, 2009, 5 pages; published at www.technovelgy.com.

Wikipedia; *RFID*; Mar. 6, 2009; 2 pages; published at http://rfidsoup.pbwiki.com.

State Intellectual Property Office, P.R. China; Chinese Application No. 200980139651.6; First Office Action issued Dec. 28, 2012; 9 pages Chinese text and 17 pages English translation (total 26 pages); Beijing, China.

EPO; App. No. 09805638.5; Extended European Search Report mailed Mar. 28, 2012.

* cited by examiner

APPARATUS AND METHOD FACILITATING COMMUNICATION BETWEEN COMPONENTS OF A RADIO FREQUENCY IDENTIFICATION SYSTEM

This application claims the benefit of U.S. Provisional Application No. 61/086,925, filed Aug. 7, 2008, which is incorporated in its entirety herein by reference.

BACKGROUND OF THE INVENTION

1. Field of the Invention

The present invention relates generally to radio frequency identification (RFID) devices, and more specifically relates to communications between RFID tags and a reader.

2. Discussion of the Related Art

Radio-frequency identification (RFID) is the use of an object (typically referred to as an RFID tag) applied to or incorporated into a product, animal, or person for the purpose of identification and tracking using radio waves. Some tags can be read from several meters away and beyond the line of sight of the reader. A conventional RFID system includes a reader or interrogator and one or more tags. The reader can transmit wireless signals to the tag/s, and the tag/s can transmit wireless signals to the reader. Wireless signals from a tag contain a tag identification code that uniquely identifies the particular tag that produced these wireless signals.

Most RFID tags contain at least two parts. One is an integrated circuit for storing and processing information, modulating and demodulating a radio-frequency (RF) signal, and other specialized functions. The second is an antenna for receiving and backscattering the signal. There are generally three types of RFID tags: active RFID tags, which contain a battery and can transmit signals autonomously, passive RFID tags, which have no battery and require an external source to provoke signal transmission and battery assisted passive (semi-passive) which require an external source to wake up but have significant higher forward link capability providing great read range.

There are a variety of factors that can degrade or prevent communication between the reader and a tag. As one example, if the tag is too far from the reader, the signal received at the tag will no longer contain enough energy to power the tags internal circuitry. As another example, the tag may be suitably close to the reader, but may be oriented in such a way that it cannot absorb enough energy from the received signal to power its internal circuitry. As yet another example, there may be an object disposed between the reader and the tag that absorbs or reflects the wireless signal transmitted by the reader, such that by the time the signal gets to the tag, the signal does not have enough remaining energy to power the internal circuitry of the tag.

SUMMARY OF THE INVENTION

Several embodiments provide methods and apparatus to improve communications between an RFID reader and one or more RFID tags.

In one embodiment, an apparatus comprises a first antenna configured to communicate with a radio frequency identification (RFID) reader; a second antenna separate from said first antenna, and configured to communicate with at least one RFID tag; and structure electrically coupling said first and second antennas.

In another embodiment, a radio frequency identification (RFID) system comprises a reader; one or more first antennas configured to communicate with the reader; a plurality of second antennas separate from the one or more first antennas, each of the plurality of second antennas configured to communicate with at least one RFID tag; and one or more switches for selectively electrically coupling each of the one or more first antennas to a respective one of the plurality of second antennas.

In a further embodiment, a radio frequency identification (RFID) system comprises an RFID reader; a plurality of reader repeaters, wherein each reader repeater comprises: a first antenna configured to communicate with the RFID reader; a second antenna separate from said first antenna, and configured to communicate with one or more RFID tags; and structure electrically coupling said first and second antennas; and a plurality of groups of RFID tags, each group comprising the one or more RFID tags.

In another embodiment, a radio frequency identification (RFID) system comprises a first reader repeater configured to receive signaling from an RFID reader and rebroadcast first repeated signaling; and a second reader repeater configured to receive the first repeated signaling and rebroadcast second repeated signaling to one or more RFID tags.

In yet another embodiment, a method comprises: receiving signaling from a radio frequency identification (RFID) reader; rebroadcasting the signaling; and receiving the signaling having been rebroadcast at an RFID tag.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
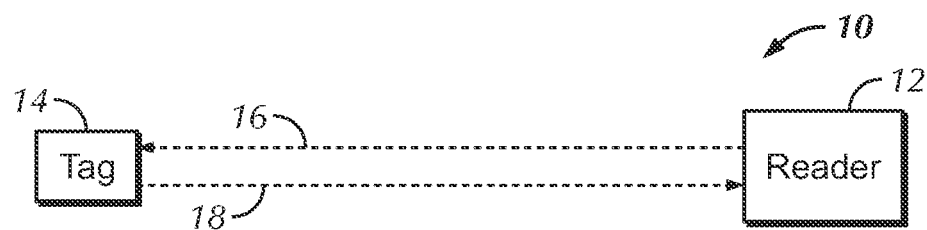
FIG. 1 is a block diagram of a conventional radio frequency identification (RFID) apparatus that includes a reader or interrogator, and a tag.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

FIG. 1 is a block diagram of a conventional radio frequency identification (RFID) apparatus 10 that includes a reader or interrogator 12, and a tag 14. As a practical matter, the reader 12 would typically communicate with a plurality of tags 14, but for the purpose of clarity in this description, only a single tag 14 is shown in FIG. 1. The reader 12 can transmit wireless signals 16 to the tag 14, and the tag 14 can transmit wireless signals 18 to the reader 12. The wireless signals 18 from the tag 14 contain a tag identification code that uniquely identifies the particular tag that produced these wireless signals.

In the embodiment of FIG. 1, the tag 14 is a passive tag. Alternatively, however, the tag could be a semi-passive tag or an active tag. In the case of a passive or semi-passive tag, the tag 14 takes a portion of the energy in the received signal 16, and uses this energy to power its internal circuitry. Another portion of the energy from the received signal 16 is effectively reflected in order to form the signal 18, the reflected signal being modulated by the internal circuitry of the tag in order to incorporate information into the signal 18, including the unique identification code of that particular tag. The reader 12 receives the signal 18 and extracts the tag identification code, and thus knows precisely which tag 14 produced the signal 18.

There are a variety of factors that can degrade or prevent communication between the reader 12 and the tag 14. As one example, if the tag 14 is too far from the reader 12, then when the signal 16 from the reader reaches the tag, the signal will no longer contain enough energy to power the tags internal circuitry. As another example, the tag may be suitably close to the reader, but may be oriented in such a way that it cannot absorb enough energy from the signal 16 to power its internal circuitry. As yet another example, there may be an object disposed between the reader 12 and the tag 14 that absorbs or reflects the wireless signal 16 transmitted by the reader 12, such that by the time the signal gets to the tag, the signal does not have enough remaining energy to power the internal circuitry of the tag. Several of the embodiments discussed below are configured to address these types of problems.

Figure 2:
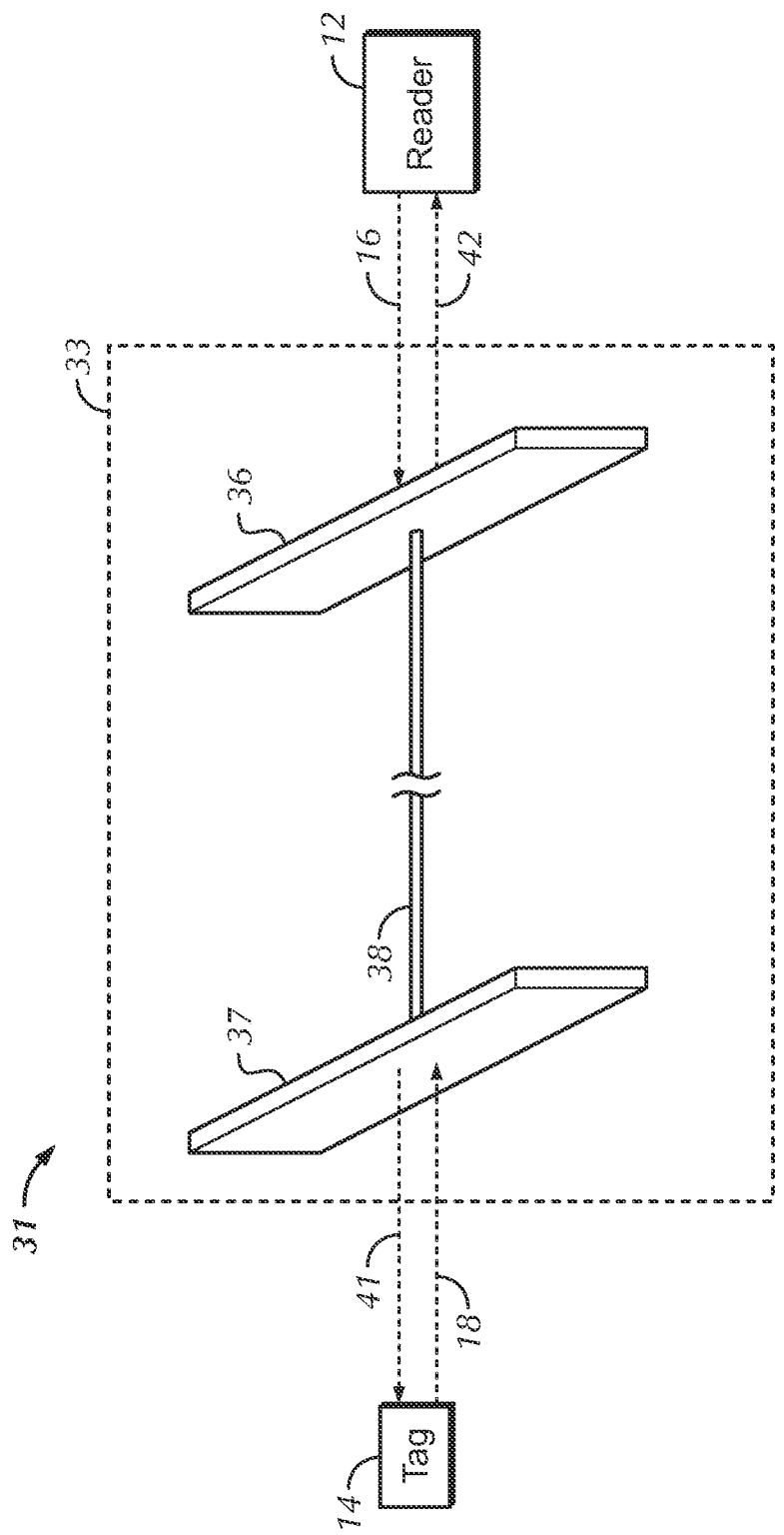
FIG. 2 is a diagrammatic view of an RFID apparatus that embodies aspects of the invention, that includes the reader and tag of FIG. 1, and that further includes an intermediate apparatus disposed between the reader and the tag.

FIG. 2 is a diagrammatic view of an RFID apparatus 31 that embodies aspects of the invention, that includes the reader 12 (also referred to generically as an RFID reader) and tag 14 (also referred to generically as an RFID tag), and that further includes an intermediate apparatus 33 disposed between the reader 12 and the tag 14. The intermediate apparatus 33 includes two spaced antennas 36 and 37 that are electrically coupled by a coaxial cable 38. The wireless signal 16 from the reader 12 impinges on the antenna 36, is amplified by the inherent gain of the antenna 36, then travels through the cable 38, and then is rebroadcast as signal 41 by the antenna 37, for travel to the tag 14. Similarly, the wireless signal 18 from the tag 14 impinges on the antenna 37, is amplified by the inherent gain of the antenna 37, travels through the cable 38, and then is rebroadcast as signal 42 by the antenna 36, for travel to the reader 12. It is noted that generally, when using the term "rebroadcasting" throughout this specification, this refers to the retransmitting or repeating of the signal from the reader 12 (and/or from the tag 14, as described in some embodiments). The rebroadcasting may be to one or more tags 14 or to one or more readers 12. In some embodiments, rebroadcasting includes rebroadcasting the signal in a way that alters a characteristic of the original signal, e.g., in some embodiments, rebroadcasting transforms the signal. In some embodiments, rebroadcasting involves generating a new signal that is substantially a copy of the signal from the reader 12, or a transformed copy of the signal from the reader 12.

For a given distance between the reader 12 and the tag 14, the intermediate apparatus 33 will cause the tag 14 to receive more energy from the signal 16 than would be the case if the intermediate apparatus 33 was not present. Similarly, the reader 12 will receive more energy from the signal 18 than would be the case if the intermediate apparatus 33 was not present. Moreover, since the tag 14 is receiving more energy from signal 41 then would be the case without the intermediate apparatus 33, the signal 18 from the tag will be stronger than if the intermediate apparatus were omitted, even before the signal 18 reaches the intermediate apparatus 33.

In the illustrated embodiment of FIG. 2, the antennas 36 and 37 are each a commercially-available panel antenna, with a gain of approximately 8 dbi to 12 dbi. For example, a given antenna is formed on a substrate and contained within a housing. However, other embodiments are not limited to panel antennas, and it would be possible to use any other suitable antenna configuration. Also, in some embodiments, each antenna can be selected to have characteristics that are beneficial for the particular application in which the antenna is used. For example, depending on the particular application, either antenna could be selected to have a configuration that is directional or omni-directional, to be configured for near field or far field operation, to have a circular polarization or a linear polarization, to have a right-hand polarization or a left-polarization, and so forth. Also, in the embodiment of FIG. 2, the cable 38 is a coaxial cable. However, it would alternatively be possible to use a non-coaxial cable or some other wiring configuration to electrically couple the two antennas 36 and 37. In another embodiment, the antennas are electrically coupled using a conductive component (e.g., plate, bracket, pipe, etc.). Such conductive component could be part of a housing containing the intermediate apparatus 33 should it be at least partially contained in a housing. In a further embodiment, the antennas 36 and 37 are coupled together using a simple connector, which could be a simple welded or melted connection. Accordingly, the above are examples of a structure useful to electrically couple the antennas 36 and 37 together.

By way of analogy, in some embodiments, the intermediate apparatus 33 (and other intermediate apparatuses as described herein) may be referred to as an RFID repeater, a reader repeater or a tag repeater since it functions to receive energy from one or both of the reader and the tag 14, focus that energy and rebroadcast the energy toward the other of the reader 12 and the tag 14. Such a repeater function can extend the range of communication between a typical reader and tag without requiring any modification to the reader 12 or tag 14. In this way, several embodiments of an intermediate apparatus can be positioned or located in an existing RFID system having a reader and at least one tag. The intermediate apparatus will collect radio signaling in the air from one or more readers and rebroadcast those signals to provide for greater communication range between a reader and a tag. In embodiment, the range of communication between a reader 12 and a tag 14 may be up to 100 feet for more.

By way of another analogy, in some embodiments, the intermediate apparatus 33 may also be considered to function as a form of radio frequency (RF) lens to transform or redirect a received signal to a rebroadcast signal. As one example, the intermediate apparatus 33 could be configured to take a circular polarized signal received from a reader and rebroadcast it as a linear polarized signal, in order to more efficiently power tags having the same linear orientation. As another example, the intermediate apparatus 33 could take a linear polarized signal and change it to a circular polarized signal, in order to improve the efficiency with which the signal is received by an antenna disposed within the reader 12. As a further example, the intermediate apparatus 33 could take use a directional antenna to receive signals from the reader 12 and use an omni-directional antenna to rebroadcast the signal to the tag 14. In these examples, the intermediate apparatus transforms the received signaling into a new form or with different characteristics and broadcast.

In some embodiments, the antennas 36 and 37 are designed to have a minimum separation therebetween. For example, in some cases, if the antennas 36 and 37 are too physically close to each other, there is feedback. In such embodiments, the designer tries to position the antennas close to each other but not close enough to cause an unacceptable amount of feedback. In some implementations, some amount of feedback is helpful and can help serve to amplify signals.

It is noted that in some embodiments, the intermediate apparatus 33 (and other intermediate apparatuses described herein) may be rigidly held in a fixed relationship to each using a housing (not illustrated). For example, the components of the intermediate apparatus 33 may be contained within a housing, which can be a single or multiple piece housing. In some embodiments, one or both of antennas 36 and 37 are formed on an outer surface of the housing or extend from a portion of the housing.

Figure 13:
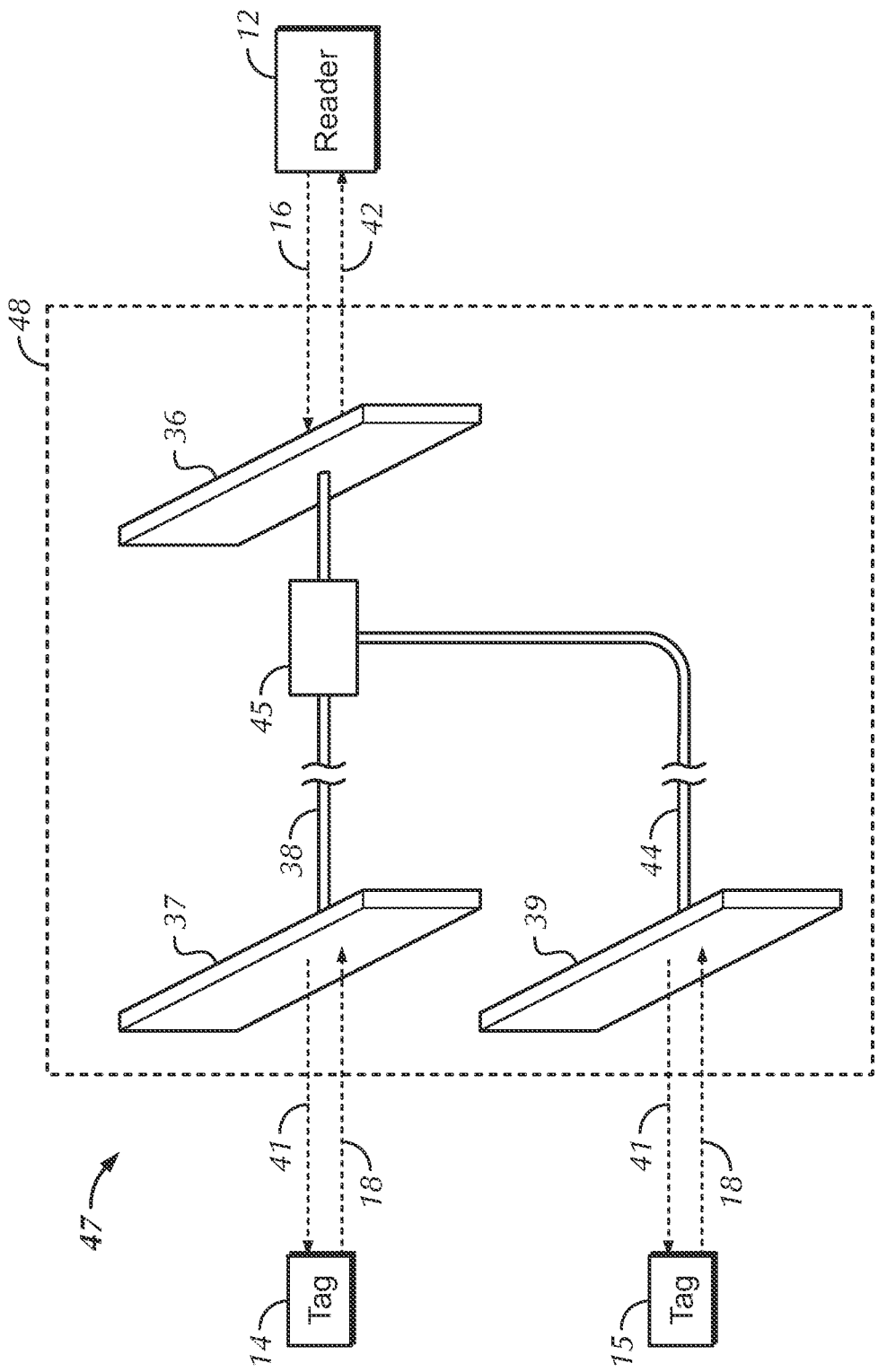
FIG. 13 is a diagrammatic view of an RFID apparatus that is a further embodiment of the RFID apparatus in FIG. 2.

In FIG. 2, there are two antennas 36 and 37 that are electrically coupled. However, it would be possible to provide more antennas. As one example, referring to FIG. 13, there could be a third antenna 39. FIG. 13 is a diagrammatic view of an RFID apparatus 47 that is a further embodiment of the RFID apparatus in FIG. 2. Equivalent parts are identified by the same reference numerals, and the following discussion focuses primarily on the differences. The intermediate apparatus 48 of FIG. 13 further includes the third antenna 39. The output of the antenna 36 is supplied to a two-way splitter 45 (and combiner), and the two outputs of the splitter 45 are each be coupled through cable 38 to antenna 37 and through cable 44 to the third antenna 39. Antenna 37 communicates with the tag 14, while antenna 39 communicates with tag 15. It is understood that although tags 14 and 15 are illustrated as one tag each, that they could each be a respective groups of tags. For clarity purposes, only one tag 14 and one tag 15 is illustrated. Accordingly, in one embodiment, antenna 37 has an orientation to serve one group of tags, and the third antenna 39 has a different orientation to serve a different group of tags.

Similar to that described above, the wireless signal 16 from the reader 12 impinges on the antenna 36, is amplified by the inherent gain of the antenna 36, then travels through the cable 38, to the splitter 45. The signal is then sent to one or both of antennas 37 and 39 and then is rebroadcast as signals 41 by the antennas 37 and 39, for travel to the tags 14 and 15. Similarly, the wireless signals 18 from the tags 14 and 15 impinge on the antennas 37 and 39, are amplified by the inherent gain of the respective antennas 37 and 39, travel through the cable 38, are combined at the splitter 45 and then are rebroadcast as signal 42 by the antenna 36, for travel to the reader 12. The characteristics of the third antenna 39 may be varied or selected similar to those of antenna 37.

In some embodiments, the splitter 45 functions to split the received signal, e.g., to send a portion of the signal energy to antenna 37 and a portion to antenna 39. In some embodiments, the splitter 45 functions as a switching mechanism to selectively switch the signal 16 between one or both of the antennas 37 and 39 to selectively read tags 14 and 15 at different times or at the same time. Further details and embodiments are described further below.

Figure 3:
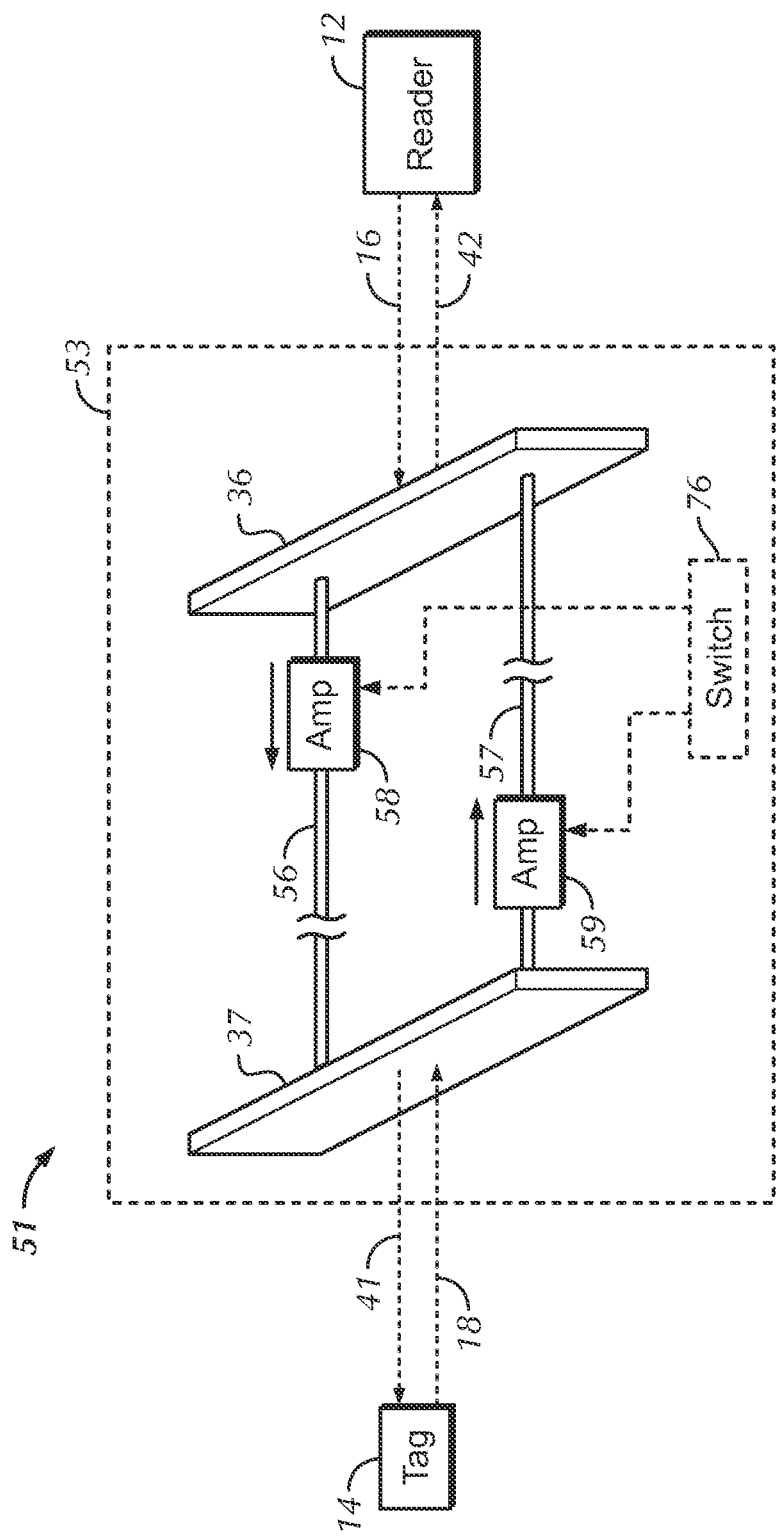
FIG. 3 is a diagrammatic view of an RFID apparatus that is an alternative embodiment of the RFID apparatus in FIG. 2.

FIG. 3 is a diagrammatic view of an RFID apparatus 51 that is an alternative embodiment of the RFID apparatus 31 in FIG. 2. Equivalent parts are identified by the same reference numerals, and the following discussion focuses primarily on the differences. The embodiment of FIG. 3 is generally similar to the embodiment of FIG. 2, except that the intermediate apparatus 33 of FIG. 2 has been replaced with a different intermediate apparatus 53 (also referred to as an RFID repeater, tag repeater or a reader repeater). The primary difference is that, instead of a single cable 38 extending between the two antennas 36 and 37, two separate coaxial cables 56 and 57 each extend between the two antennas 36 and 37. An inline amplifier 58 is provided in the cable 56, and a further inline amplifier 59 is provided in the cable 57. That is, the amplifier 58 is electrically coupled between the antennas 36 and 37 by the structure (cable 56) electrically coupling the antenna 36 and 37 together. Similarly, the amplifier 59 is electrically coupled between the antennas 36 and 37 by the structure (cable 57) electrically coupling the antenna 36 and 37 together. In one embodiment, the amplifiers 58 and 59 are commercially available components of a well-known type. The amplifiers each include a not-illustrated battery to power the circuitry therein, and each amplifier provides a gain of approximately 24 db. It is understood that the amplifier gain may be selected to meet the needs of the particular application.

The signal 16 from the reader 12 is collected and amplified by the antenna 36, then propagates through the cable 56, where it is further amplified by the amplifier 58, and then is rebroadcast as signal 41 by the antenna 37, for travel to the tag 14. Similarly, the signal 18 is collected and amplified by the antenna 37, then travels through the cable 57, where it is further amplified by the amplifier 59, and then is rebroadcast as signal 42 by the antenna 36, for travel to the reader 12.

For clarity, FIG. 3 shows two cables 56 and 57 that each include a unidirectional amplifier 58 or 59. However, it would alternatively be possible to provide a functionally equivalent arrangement in which only a single cable extends between the two antennas 36 and 37, and in which a single inline, bidirectional amplifier is provided in that cable.

As discussed above, the embodiment of FIG. 3 includes amplifiers 58 and 59, whereas the embodiment of FIG. 2 does not include any amplifiers. For any specific application, one factor influencing the decision of whether or not to provide an amplifier is the degree of gain provided by one or both antennas. In this regard, some types of antennas provide little or no gain, and it can be desirable in some embodiments to supplement these antennas with an amplifier, in order to achieve a level of overall gain appropriate for the needs of the particular application. Other types of antennas provide a moderate amount of gain, but may still need to be supplemented with an amplifier in order to achieve a level of overall gain appropriate for the needs of the particular application. In the latter scenario, the amount of gain needed from the amplifier may be less than in the former scenario. Still other types of antennas inherently provide sufficient gain that no further amplification is needed in order to achieve the level of gain needed for the particular application.

In some implementations and depending on the characteristics of the components, the use of the embodiment of FIG. 3 may result in multipath interference for signals 42 received at the reader 12. For example, since signal 41 is an amplified signal, the response signal 18 is also amplified (when using a passive or semi-passive tag). In some implementations, the response signal 18 has sufficient energy to reach the reader 12 without requiring further rebroadcasting by the return path of the intermediate apparatus 53. In these cases, the signals 42 can interfere with the direct signals 18 that reach the reader 12. In further cases, while the response signal 18 would otherwise have enough energy to reach the reader 12, it is located in a blind spot from the perspective of the reader 12 or is shielded (e.g., behind a metal wall, shelf, holder, within a metal container, crate, cage, etc.) in a manner that prevents the direct signal 18 from reaching the reader 12. In these cases, the intermediate apparatus 53 is effective to rebroadcast the signal 42 without multipath interference from signals 18.

With reference to FIG. 3, it is possible to optionally provide a switch 76 that is coupled to each of the amplifiers 58 and 59, and that can selectively enable and disable these amplifiers. For example, the switch 76 may selectively permit and interrupt the supply of electrical power to the amplifiers 58 and 59. Since the switch 76 is optional, it is shown in broken lines in FIG. 3. The switch 76 may be a simple, manually-operated mechanical switch, or may be a more sophisticated device having an electronic switch operated by a control unit or control circuit (e.g., see control unit 88 of FIG. 15). The control unit could, for example, be the circuitry within an RFID tag. Alternatively, the control circuit could operate according to sleep and wake cycles using a timer in which it is in a sleep mode in which the amplifier 58/59 is disabled and periodically wakes up and enables the amplifier 58/59.

Figure 14:
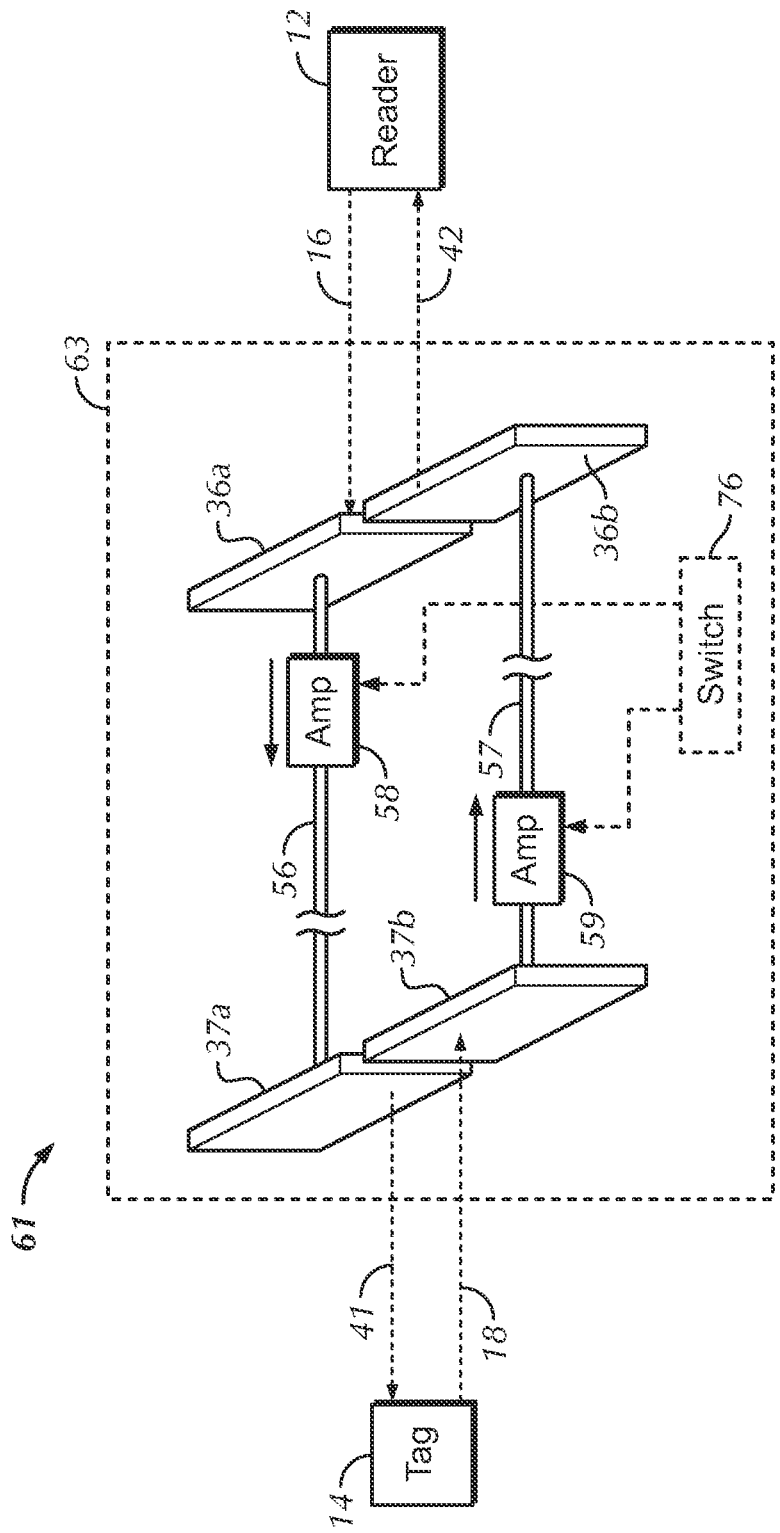
FIG. 14 is a diagrammatic view of an RFID apparatus that is an alternative embodiment of the RFID apparatus in FIG. 3.

FIG. 14 is a diagrammatic view of an RFID apparatus 61 that is an alternative embodiment of the RFID apparatus in FIG. 3. Equivalent parts are identified by the same reference numerals, and the following discussion focuses primarily on the differences. In this embodiment, each of antennas 36 and 37 of the intermediate apparatus 63 is actually two separate antennas. The reader-side includes antennas 36a and 36b, and the tag-side includes antennas 37a and 37b. Panel antennas that contain two antennas built into the same structure are commercially available. Antennas 36a and 37a are electrically coupled together by cable 56, whereas antennas 36b and 37b are electrically coupled together by cable 57. However, antennas 36a and 36b, and antennas 37a and 37b are not electrically coupled together.

Figure 4:
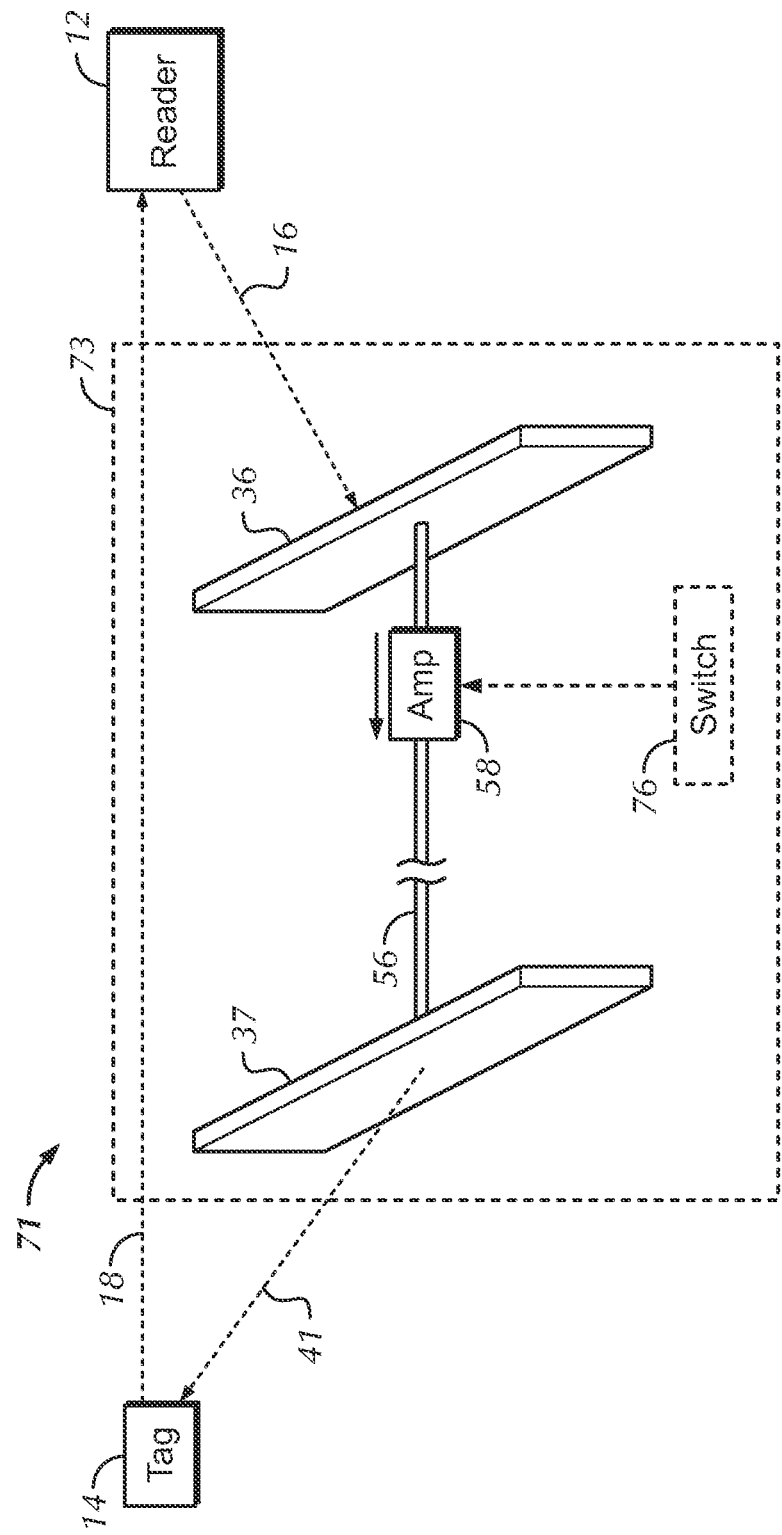
FIG. 4 is a diagrammatic view of an RFID apparatus that is an alternative embodiment of the apparatus of FIG. 3.

FIG. 4 is a diagrammatic view of an RFID apparatus 71 that is an alternative embodiment of the apparatus 51 of FIG. 3. Equivalent parts are identified by the same reference numerals, and the following discussion focuses primarily on the differences. The RFID apparatus 71 of FIG. 4 has an intermediate apparatus 73 (also referred to as an RFID repeater or a reader repeater) that is similar to the intermediate apparatus 53 of FIG. 3, except that the cable 57 and amplifier 59 are omitted, so that only the cable 56 and amplifier 58 couple the antennas 36 and 37. In this case, antennas 37 and 38 are each a single antenna.

The signal 16 from the reader 12 is collected and amplified by the antenna 36, then propagates through the cable 56, where it is further amplified by the amplifier 58, and then is rebroadcast as signal 41 by the antenna 37, for travel to the tag 14. Due to the effect of the intermediate apparatus 73, the tag 14 receives significantly more energy from the signal 16 than would be the case in the absence of the intermediate apparatus 73. As a result, the signal 18 from the tag 14 contains significantly more energy than would be the case in the absence of the intermediate apparatus 73. Accordingly, the signal 18 from the tag 14 is sufficiently strong to travel to and be received by the reader 12, without assistance from the intermediate apparatus 33. Accordingly, the return path of the intermediate apparatuses of FIGS. 2 and 3 is not needed. In the event the return path of the intermediate apparatus was used, depending on the components and implementation, this may result in multipath feedback due to signals 42 and signals 18 direct from the tag 14 reaching the reader 12. It is noted that the antenna 37 can receive signal energy from signal 18, but since amplifier 58 is unidirectional, signal energy in the return direction is blocked.

In one variation, one or both of antennas 36 and may be selected to inherently amplify the signaling passing therethrough, such that the separate amplifier 58 is not needed. Thus, through the proper selection of one or both of antennas 36 and 37, the amplifier 58 is not needed, and the device will function as shown in FIG. 4 where the signals 18 have sufficient energy to reach the reader 12.

In FIG. 4, there are two antennas 36 and 37 that are electrically coupled. However, it would be possible to provide more antennas. As one example, similar to the embodiment of FIG. 13, there could be a third (not-illustrated) antenna, like antenna 39 of FIG. 13. The output of the antenna 36 could be supplied to a two-way splitter (such as splitter 45), and the two outputs of the splitter could each be coupled through a respective cable and a respective inline amplifier (controlled by a respective optional switch) to a respective one of the third antenna and the antenna 37. The antenna 37 might have one orientation to serve one group of tags (tags 14, 15), and the third antenna might have a different orientation to serve a different group of tags. In these embodiments, the splitter 45 would not be a combiner since it would block signal in the return path. Due to their amplification in the reader to tag direction, the response signals 18 from the tags 14, 15 would have sufficient energy reach the reader 12 without needing further amplification.

Figure 5:
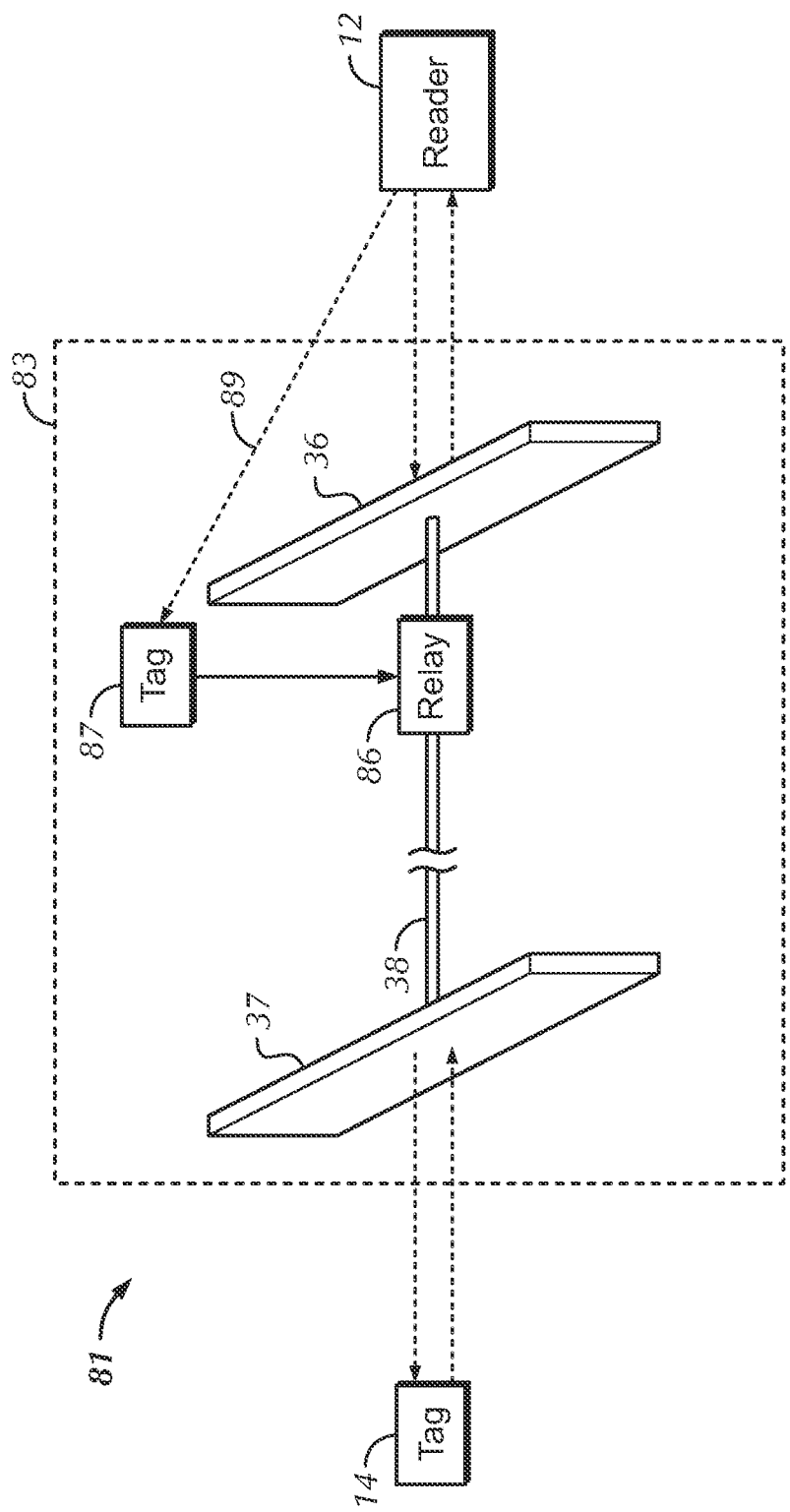
FIG. 5 is a diagrammatic view of an RFID apparatus that is a further alternative embodiment of the apparatus of FIG. 2.

FIG. 5 is a diagrammatic view of an RFID apparatus 81 that is a further alternative embodiment of the apparatus 31 of FIG. 2. Equivalent parts are identified by the same reference numerals, and the following discussion focuses primarily on the differences. The RFID apparatus 81 has an intermediate apparatus 83 that is generally similar to the intermediate apparatus 33 of FIG. 2, except that it includes a relay 86 of a known type, and a battery-operated tag 87 (i.e., an active tag). The relay 86 is an inline component disposed in the coaxial cable 38, between the antennas 36 and 37. When the relay 86 is closed, the antenna is electrically coupled to the antenna 37 through the cable 38. When the relay 86 is open, it interrupts electrical communication between the antennas 36 and 37 through the cable 38. Accordingly, the relay 86 functions as a switching mechanism or switch selectively coupling the antenna 36 to the antenna 37, which selectively enables or disables the intermediate apparatus 83.

In the illustrated embodiment, the tag 87 is electrically coupled to and controls the relay 86 (e.g., responsive to received signaling). That is, the tag 87 has circuitry to output a control signal to the relay 86 in response to receiving signal 89. The reader 12 can transmit wireless signals 89 to the tag 87, and these signals each instruct the tag 87 to either open or close the relay 86. In some embodiments, the reader 12 is altered and configured to be able to send a control signal modulated in the signal 89 that instructs the tag 87 to open or close the relay 86. In response to receipt of a signal 89, the tag 87 opens or closes the relay 86. For clarity, the relay 86 and the tag 87 are shown as separate components in FIG. 5. Alternatively, however, it would be possible to provide a single circuit that combines the functions of the relay 86 and tag 87. For example, in one embodiment, the tag 87 and the relay 86 are integrated.

Figure 15:
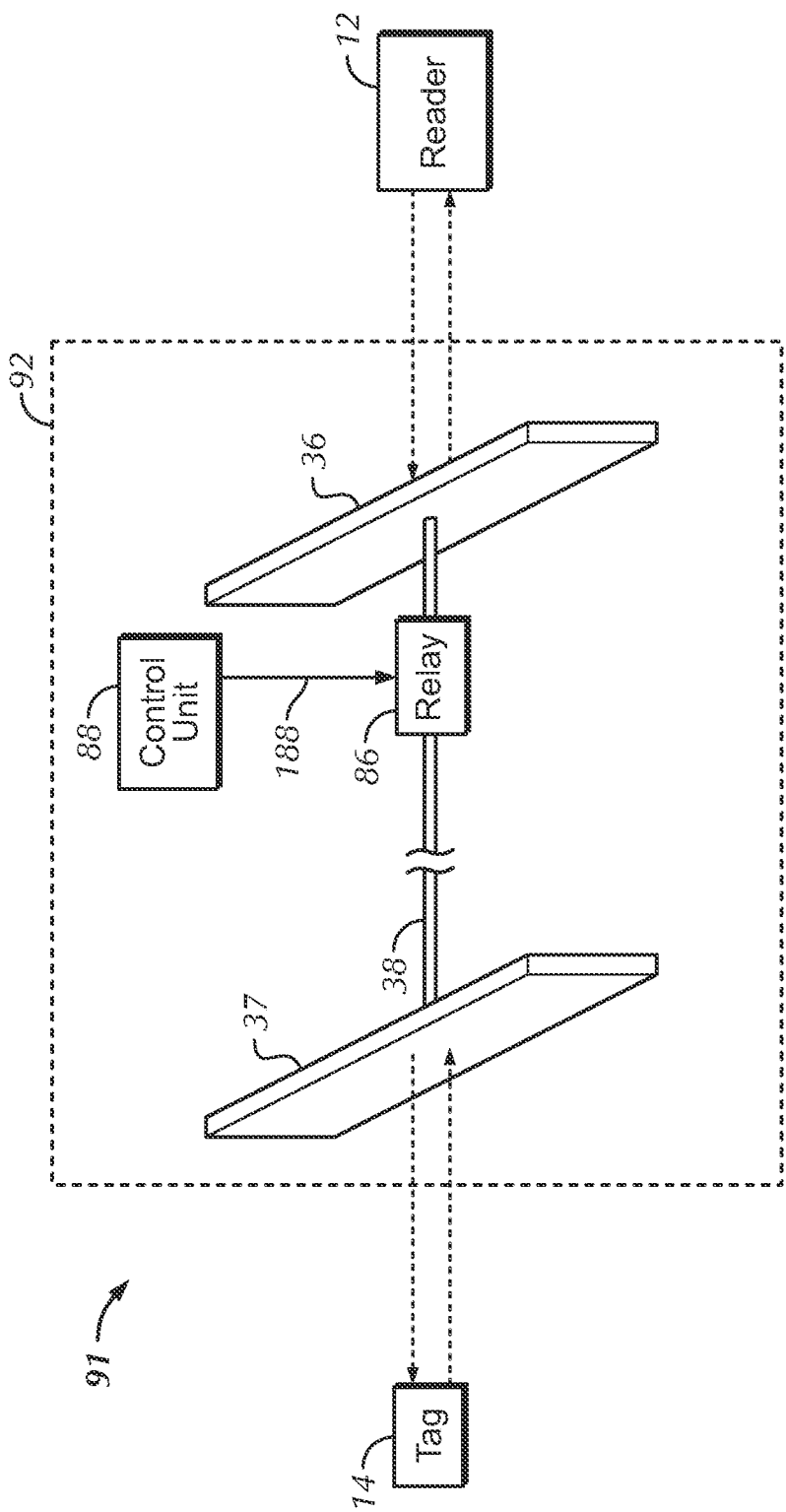
FIG. 15 is a diagrammatic view of an RFID apparatus that is an alternative embodiment of the RFID apparatus in FIG. 5.

In one variation as illustrated in the intermediate apparatus 82 of the RFID apparatus 91 of FIG. 15, the tag 87 is optionally replaced with a control unit 88 that turns the relay 86 on and off (e.g., the control unit 88 outputs a control signal 188 to the relay 86). In one form, the control unit 88 is a switch, e.g., a manually actuated on/off or toggle switch. In another embodiment, the control unit 88 is a semiconductor switch or microprocessor or microcontroller based switch. In one embodiment, such switch is activated periodically based on sleep and wake cycles using a timer (not illustrated) included in the control unit 88, such as described above. For example, the control unit 88 uses the timer and is configured to open and close the relay at predetermined times. In some forms, the predetermined times correspond to wake and sleep cycles of the control unit 88, in which it is in a sleep mode in which the relay 86 is disabled (opened) and periodically wakes up and enables (closes) the relay 86. As another alternative (not illustrated), the relay 86 could optionally be replaced with an inline amplifier, and the tag 87 or control unit 88 could selectively turn the amplifier on and off. As yet another alternative (not illustrated), an inline amplifier could be provided in the cable 38, and the relay 86 could be configured as a component that is disposed electrically between the tag 87 and the amplifier. For clarity, the relay 86 and the control unit 88 are shown as separate components in FIG. 15. Alternatively, however, it would be possible to provide a single circuit that combines the functions of the relay 86 and control unit 88. For example, in one embodiment, the control unit 88 and the relay 86 are integrated.

According to one embodiment, an RFID system designer may consider several factors in determining which of the intermediate apparatuses of FIGS. 2, 3, 4, 13, 14 and 15 to use. In one methodology, if the tag/s 14 to be read are close to the reader 12 such that amplification is not needed, but orientation of the tag/s make them difficult to read, the designer may select a configuration based on the embodiments of FIG. 2 or 13. If the tag/s 14 are far enough away from the reader 12 such that response signals 18 will not reach the reader 12 if not amplified in the reader to tag direction, then the designer may select a configuration based on the embodiments of FIG. 4 or 15. If the tag/s 14 are located or shielded such that the response signals 18 will not reach the reader 12 even if amplified in the tag to reader direction, then the designer may select a configuration based on the embodiments of FIG. 3 or 14.

Figure 6:
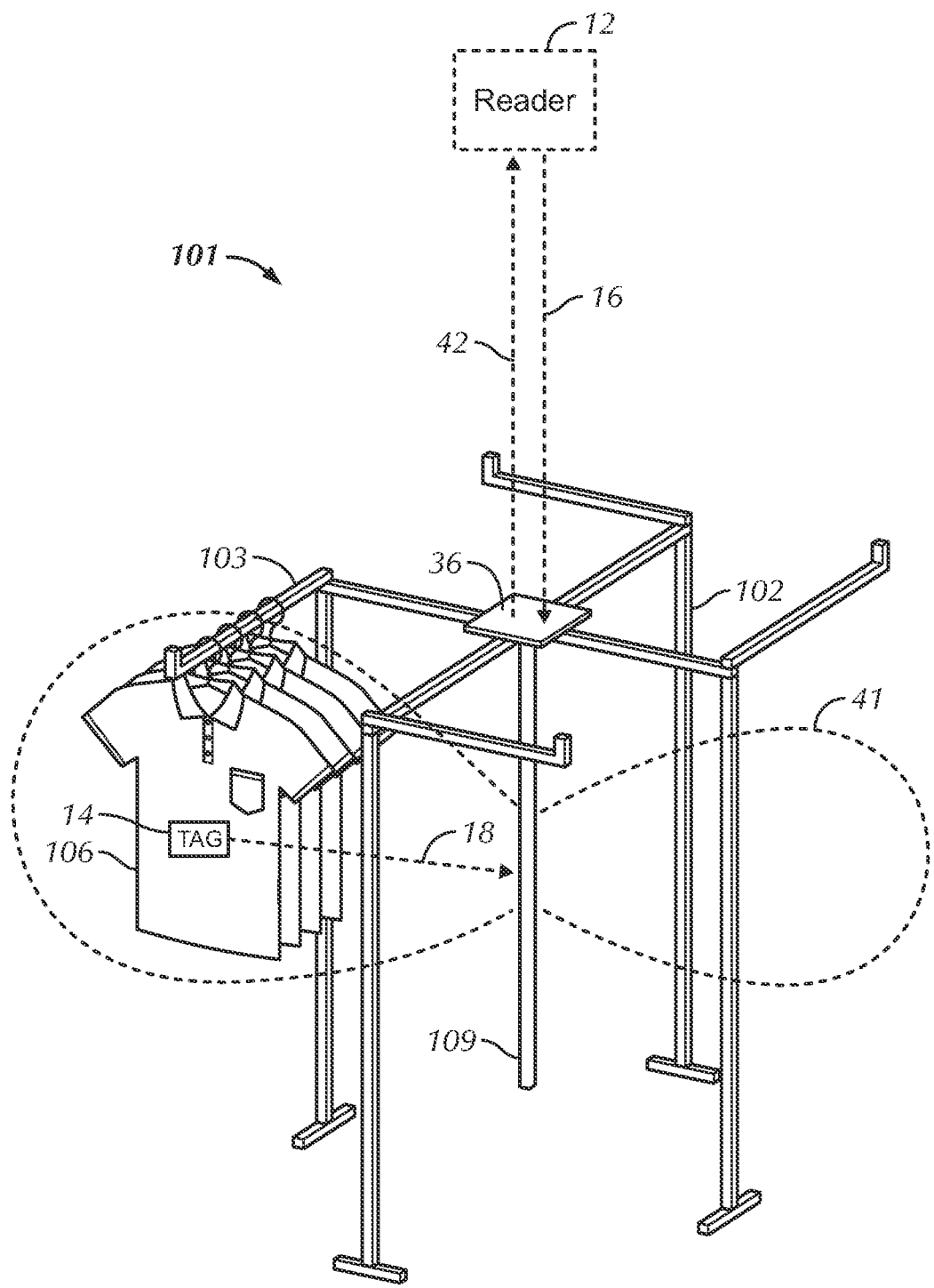
FIG. 6 is a diagrammatic perspective view of an apparatus that includes the reader and tag of FIG. 1, and also a retail garment rack in accordance with one embodiment.

FIG. 6 is a diagrammatic perspective view of one embodiment of an apparatus 101 that includes a retail garment rack 102 (which may be generically referred to as a merchandize display unit), the reader 12, at least one tag 14. The reader 12 is stationarily supported, for example on the ceiling of a retail store. The garment rack 102 includes several horizontally extending bars or supports 103. Several garments 106 can be supported by hangers on each of the horizontal bars 103. A separate tag 14 is supported on each garment 106. The garment rack 102 in FIG. 2 is exemplary, and several embodiments can be used with a variety of other garment racks having different configurations.

The garment rack 102 includes an intermediate apparatus similar to that shown at 33 in FIG. 2. More specifically, the panel antenna 36 is supported at a central location on top of the garment rack 102, and is oriented to extend horizontally. An elongate, cylindrical, omni-directional antenna 109 has been substituted for the panel antenna 37 of FIG. 2. The antenna 109 extends vertically downwardly from the panel antenna 36, to a location that is spaced above the floor. The antennas 36 and 109 are electrically coupled to each other by a very short coaxial cable that is not visible in FIG. 6. Alternatively, however, the antennas 36 and 109 could have coaxial connectors that directly engage each other, thereby eliminating the need for a separate coaxial cable. In other embodiments, other structure, such as a simple wire is used to electrically couple antenna 36 to antenna 109. In addition, although the intermediate apparatus in FIG. 6 is electrically similar to the intermediate apparatus 33 in FIG. 2, it could alternatively have some other suitable configuration. For example, it could be electrically similar to the intermediate apparatus 53 in FIG. 3, the intermediate apparatus 73 in FIG. 4, or the intermediate apparatus 83 in FIG. 5, or others of the intermediate apparatuses described herein.

The reader 12 transmits a wireless signal 16 that is collected and amplified by the panel antenna 36, and then supplied to the omni-directional antenna 109. The antenna 109 rebroadcasts this energy as an omni-directional signal 41 with an approximately toroidal shape. The tags 14 on the garments 106 receive the signal 41, and return a signal 18 that is collected and amplified by the antenna 109, and then rebroadcast at 42 by the antenna 36. Using the unique tag identification codes from the signals 18 returned by all tags 14, a not-illustrated computer system coupled to the reader 12 can maintain an accurate inventory of all of the garments 106 that are currently present on the garment rack 102.

In FIG. 6, the single omni-directional antenna 109 could be replaced with two (or more) panel antennas each having a respective different orientation. The output of the antenna 36 could be supplied to a two or more-way splitter/combiner, or two or more-way switch and the two or more outputs of the splitter/combiner/switch could each be coupled through a respective cable (or other coupling structure) to a respective one of the two or more replacement antennas. The cables between the splitter/combiner/switch and the replacements antennas could each optionally include an amplifier. In some embodiments using an amplifier, the response signals 18 have sufficient energy to reach the reader 12 without rebroadcasting by the intermediate apparatus, similar to the intermediate apparatus of FIG. 4.

Figure 16:
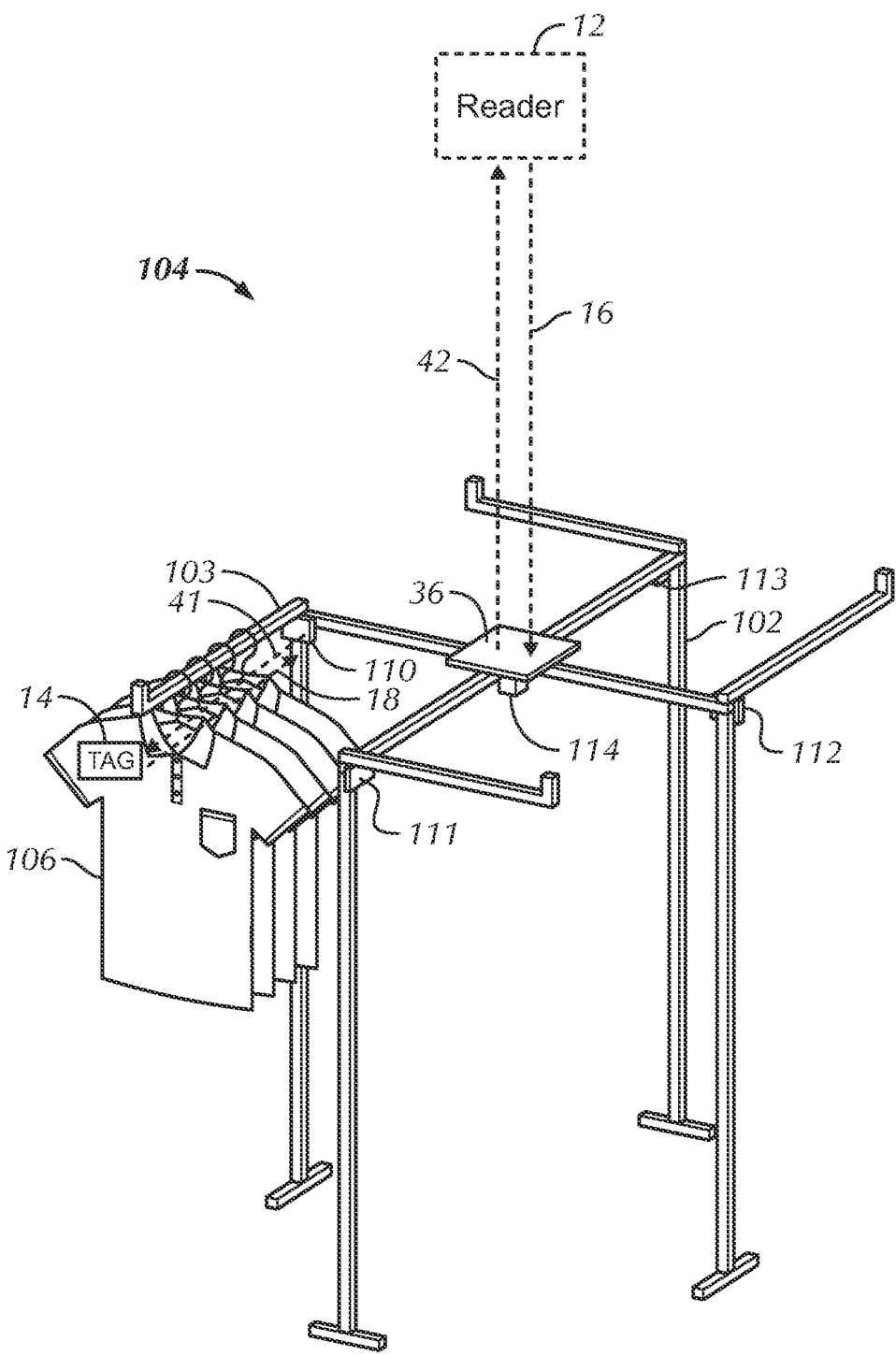
FIG. 16 is a diagrammatic perspective view of a garment rack that is a further embodiment of the garment rack of FIG. 6.

Referring to FIG. 16, a diagrammatic perspective view is shown of a garment rack that is a further embodiment of the garment rack of FIG. 6. Equivalent parts are identified by the same reference numerals, and the following discussion focuses primarily on the differences. The apparatus 104 includes antennas 110, 111, 112 and 113 each coupled by wireline (e.g., coaxial cables) to a four-way splitter/combiner 114 that is electrically coupled to the antenna 36. The four-way splitter/combiner functions to split the received signal energy to antennas 110, 111, 112 and 113 and to combine energy received back from the signals 18 received at the antennas 110, 111, 112, and 113. In the illustrated embodiment, each of the antennas 110, 111, 112 and 113 is a linear or directional antenna oriented to broadcast energy to cover a respective arm 103 of the garment rack 102. In one embodiment, the splitter/combiner 114 functions as a switching mechanism to selectively couple one arm of the garment rack at a time. In one embodiment, each arm is switched on for a minimum of 300 to 400 milliseconds. In one variation, an amplifier could be included between the antenna 36 and the splitter/combiner 114 and/or between the splitter/combiner 114 and one or more of the antennas 110, 111, 112 and 113. In operation, the system operates similarly as the embodiment of FIG. 13; however, the splitter/combiner switches between four antennas.

Figure 7:
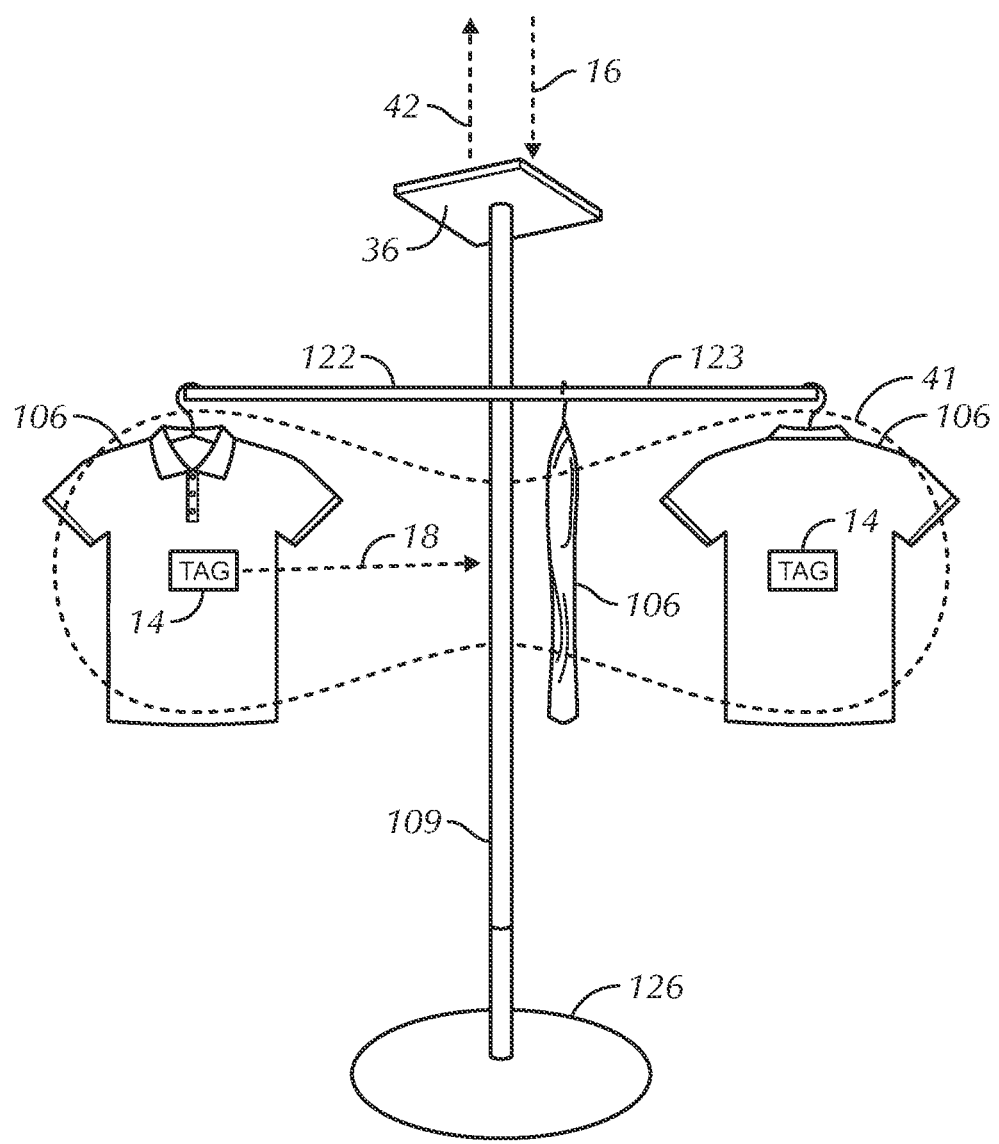
FIG. 7 is a diagrammatic perspective view of a garment rack that is an alternative embodiment of the garment rack of FIG. 6.

FIG. 7 is a diagrammatic perspective view of a garment rack 122 that is an alternative embodiment of the garment rack 102 of FIG. 6. Equivalent parts are identified by the same reference numerals, and the following discussion focuses primarily on the differences. In the embodiment of FIG. 6, the omni-directional antenna 109 does not function as a load-bearing member, or in other words does not support any of the weight of the garment rack 102 or the garments thereon. In contrast, in the embodiment of FIG. 7, the garment rack 122 is configured so that the antenna 109 serves as a single central vertical support post for the garment rack, and extends vertically from a base 126 to the panel antenna 36. An annular support or bar 123 concentrically encircles and is supported by the antenna 109, and the garments 106 with the tags 14 are supported by hangers on the bar 123. Thus, in some embodiments one or both of the antennas 36 and 109 function as load bearing members.

With respect to electromagnetic fields and electrical signals, the garment rack 122 operates in a manner similar to that described above for the garment rack 102 of FIG. 6. The operation of the garment rack 122 is therefore not described here in detail.

Figure 8:
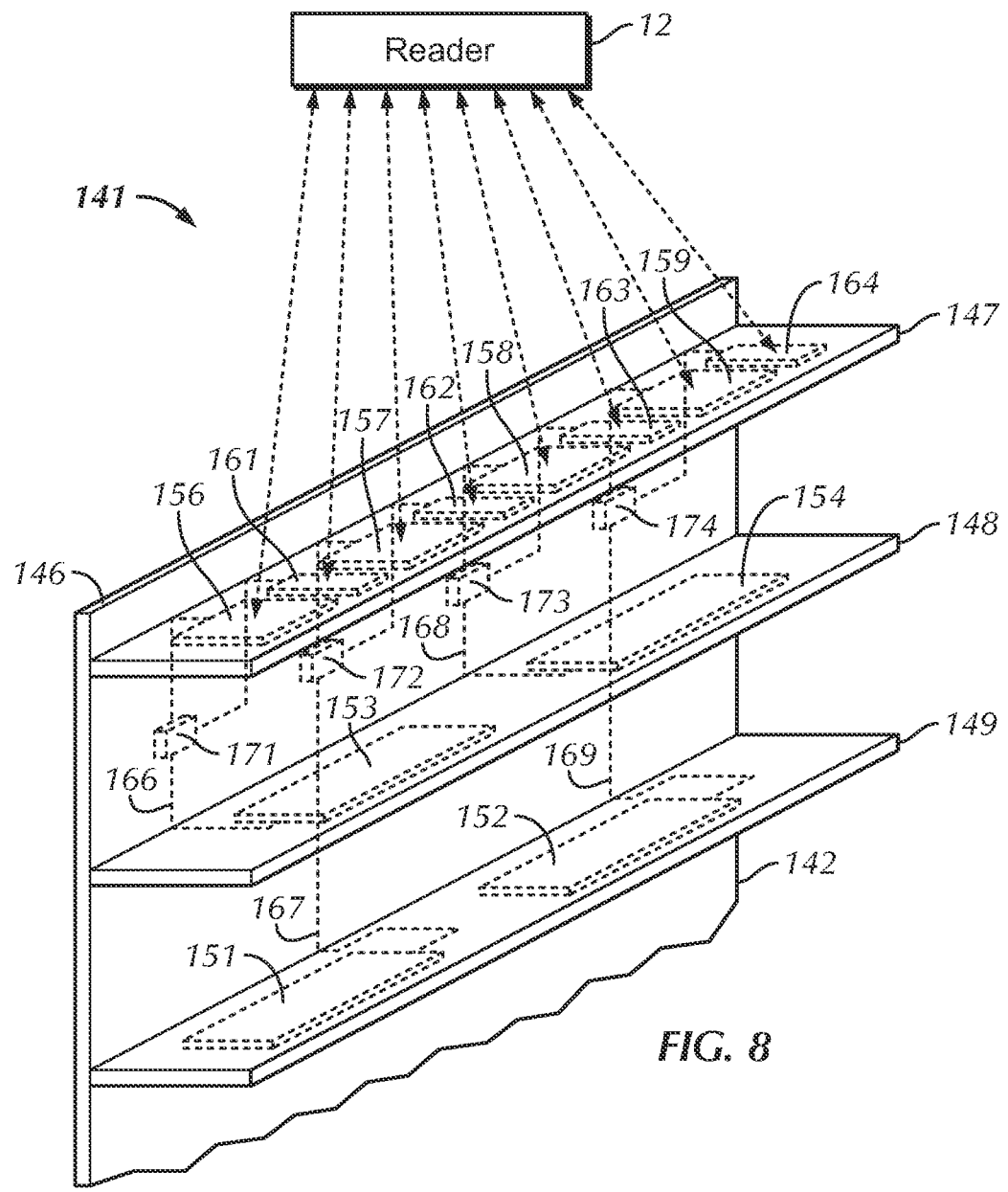
FIG. 8 is a diagrammatic perspective view of an apparatus that includes the reader of FIG. 1, and a retail shelving unit in accordance with another embodiment.

FIG. 8 is a diagrammatic perspective view of an apparatus 141 that includes a retail shelving unit 142 (which may be generically referred to as a merchandize display unit), the reader 12, and at least one not-illustrated tag. The reader 12 is stationarily supported, for example on the ceiling of a retail store. The shelving unit has a vertical back wall 146, and three horizontal shelves 147, 148 and 149 that are fixedly supported on the back wall at vertically spaced locations. In the disclosed embodiment, the shelving unit 142 is made primarily of metal. Consequently, the top shelf 147 may block or interfere with communication between the overhead reader 12 and not-illustrated tags on the middle and bottom shelves 148 and 149. Similarly, the middle shelf 148 may block or interfere with communication between the reader 12 and not illustrated tags on the bottom shelf 149.

In order to facilitate communication between the reader 12 and tags on middle and bottom shelves, the bottom shelf 149 has two spaced panel antennas 151 and 152 embedded therein, and the middle shelf 148 has two spaced panel antennas 153 and 154 embedded therein. The top shelf 147 has four spaced panel antennas 156, 157, 158 and 159 embedded therein. In addition, four battery-operated tags 161-164 are embedded in the top shelf 147. The panel antennas 156-159 in the top shelf 147 are each coupled by a respective coaxial cable 166, 167, 168 or 169 to a respective one of the panel antennas 153, 151, 154 and 152 in the middle and bottom shelves. Each of the cables 166-169 extends through a respective relay 171, 172, 173 or 174. The relays 171-174 are respectively controlled by the tags 161-164.

The antenna 156, antenna 153, relay 171 and tag 161 are respectively similar to the antenna 36, antenna 37, relay 86 and tag 87 shown in FIG. 5, and thus collectively define an intermediate apparatus that is electrically similar to the intermediate apparatus 83 in FIG. 5. Also, the antenna 157, antenna 151, relay 172 and tag 162 collectively define an intermediate apparatus that is electrically similar to the intermediate apparatus 83 in FIG. 5. In addition, the antenna 158, antenna 154, relay 173 and tag 163 collectively define an intermediate apparatus that is electrically similar to the intermediate apparatus 83 in FIG. 5. Further, the antenna 159 antenna 152, relay 174 and tag 164 collectively define an intermediate apparatus that is electrically similar to the intermediate apparatus 83 in FIG. 5.

Although no amplifiers are shown in FIG. 8, it would optionally be possible to provide one or two amplifiers for each antenna pair, for example in a manner similar to that shown in FIG. 3 and/or FIG. 4. For example, a unidirectional amplifier could be inline with or integrated into each of relays 171, 172, 173, 174 such that the apparatus functions similarly to the embodiment of FIG. 4. In this case, due to the amplification, the response signals 18 will have sufficient energy to reach the reader 12 without rebroadcasting.

The reader 12 can selectively communicate with the tags 161-164 so as to selectively open and close the relays 171-174. The reader 12 might, for example, control the relays 171-174 in a manner so that, at any given point in time, only one of these relays is closed, and the other three relays are all open. Thus, the relays 171-174 may be said to function as switches.

The shelves 147-149 can support products but, for clarity, the products are not shown in FIG. 8. By way of example, the products could be garments of the type shown at 106 in FIG. 6, where each such garment has a tag 14 thereon. Garments could be provided on the middle and bottom shelves 148 and 149. Further, since garments are relatively transparent to RF energy, garments could also be provided on the top shelf 147. In contrast, metal products such as pots and pans could be provided on the middle and bottom shelves 148 and 149, but could possibly create problems if provided on the top shelf 147. For example, metal pots and pans might interfere with communications between the reader 12 and either the antennas 156-159 or the tags 161-164.

In an alternative configuration, the antennas 156-159 might each be configured as an elongate omni-directional antenna rather than a panel antenna. The antennas 156-159 and the tags 161-164 could then all be supported on top of the back wall 146, rather than being embedded within the top shelf 147. In that case, products such as metal pans could be provided on the top shelf 147, and would not block or interfere with communications between the reader 12 and either the antennas 156-159 or the tags 161-164.

As to products that are on the top shelf 147, the reader 12 can directly communicate with the tags on these products. The metal shelf 147 may tend to block direct communication between the reader 12 and tags on products supported on the middle and bottom shelves 148 and 149, and the metal shelf 148 may tend to block direct communication between the reader 12 and tags on products supported on the bottom shelf 149. However, the reader 12 can readily communicate with the tags on products supported on the middle shelf 148, using the intermediate arrangements that include the panel antennas 156, 158, 153 and 154. Further, the reader 12 can readily communicate with the tags on products supported on the bottom shelf 149, using the intermediate arrangements that include the panel antennas 157, 159, 151 and 152.

Figure 9:
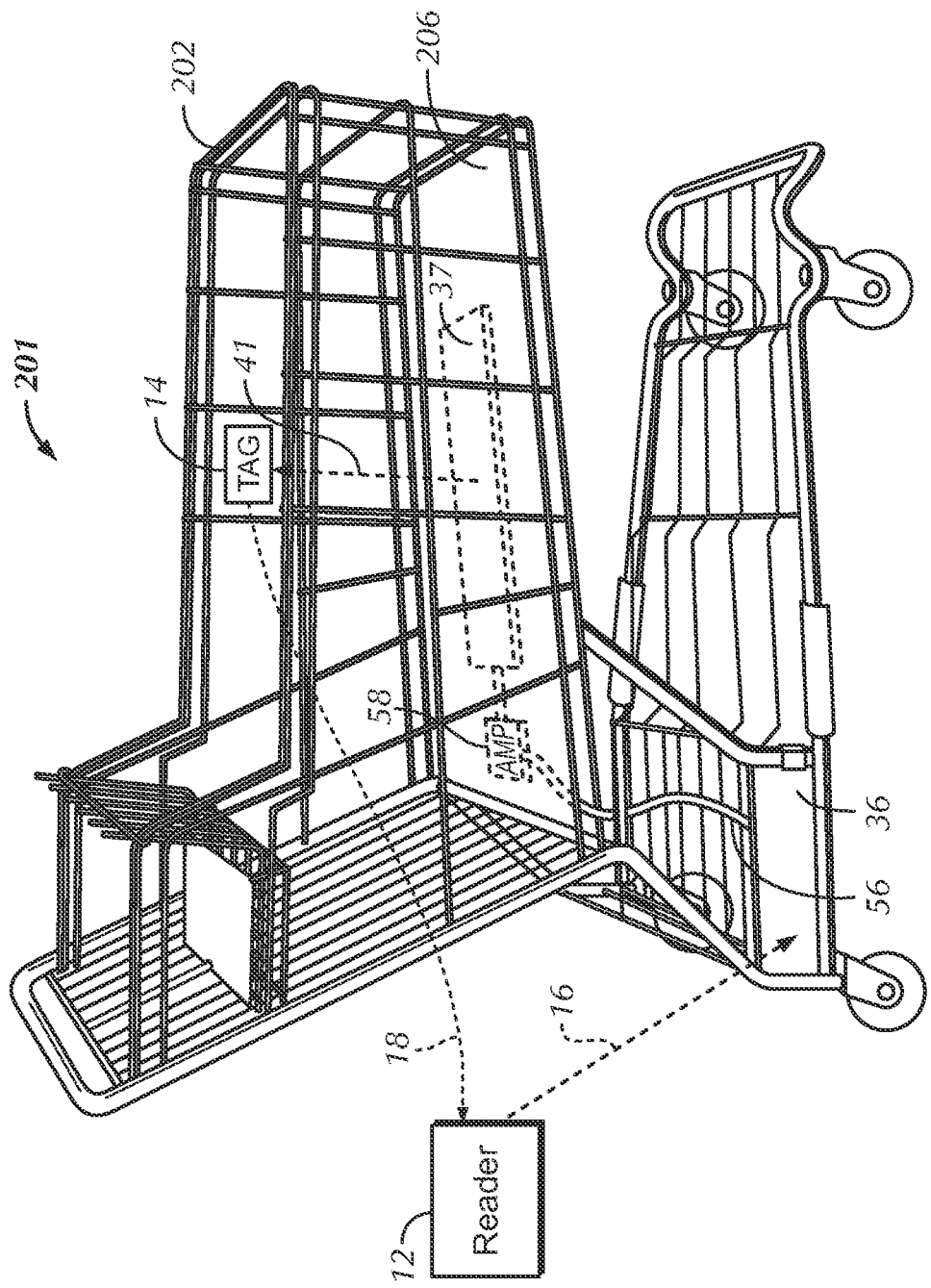
FIG. 9 is a diagrammatic perspective view of an apparatus in accordance with a further embodiment that includes a shopping cart, and an intermediate apparatus that is supported on the shopping cart and that is of the type shown in FIG. 4.

FIG. 9 is a diagrammatic perspective view of an apparatus 201 that includes a shopping cart 202. An intermediate apparatus of the type shown at 73 in FIG. 4 is supported on the shopping cart 202, including panel antennas 36 and 37, a cable 56, and a unidirectional amplifier 58. The amplifier is optional, and could be omitted, or in some cases, may be a bidirectional amplifier such the intermediate apparatus functions like that of FIG. 3. A plastic sheet or panel 206 rests on top of the wire mesh that defines the bottom wall of the basket of the shopping cart. The amplifier 58, the antenna 37 and a portion of the cable 56 are embedded within the plastic panel 206, such that the antenna 37 extends approximately horizontally. In some cases, the plastic panel 206 helps to protect the antenna 37 and the amplifier 58. In some embodiments, the antenna 37 may be designed to match the dielectric effect of the plastic material. The antenna 36 is supported on a lower portion of the shopping cart near one of the rear wheels. The antenna 36 is oriented so that it extends vertically, and extends approximately parallel to the direction of forward travel of the shopping cart.

One possible scenario for use of the shopping cart 202 is that, when a shopper is ready to check out and enters a checkout aisle at a point-of-sale (POS) terminal, a stationary, reader 12 disposed near the floor on one side of the aisle (note the drawing of FIG. 9 is not to scale) transmits wireless signals that are collected and amplified by the antenna 36, that propagate through the cable 56, that are further amplified by the amplifier 58, and that are then rebroadcast by the antenna 37. Not-illustrated products within the basket of the shopping cart 202 would carry not-illustrated tags (one exemplary tag 14 is illustrated) similar to the tag 14 shown in FIG. 2. The tags on the products within the basket would receive the wireless signals rebroadcast by the antenna 37, and would then produce wireless signals. In the illustrated embodiment, the signals from the tags are strong enough to travel directly to the reader 12. Alternatively, the signals from the tags could be collected and amplified by the antenna 37, propagate through the cable 56 and be further amplified by the amplifier 58 (if a bi-directional amplifier) or a separate amplifier (not shown, like amplifier 59 of FIG. 3), and then be rebroadcast by the antenna 37 for travel to the reader. In either case, the products within the shopping cart can be automatically and reliably inventoried. It is noted that the reader can easily resolve multiple receptions of signals from a given tag (e.g., direct from the antenna 37 and through the antenna 36) since the signals from the given tag include a tag identification code that uniquely identifies the given tag. It is noted that in some cases, the shopping cart 202 is metallic and functions as an RF shield that inhibits RF signals; thus, in some embodiments including the illustrated embodiment, one or more amplifiers are used.

Figure 10:
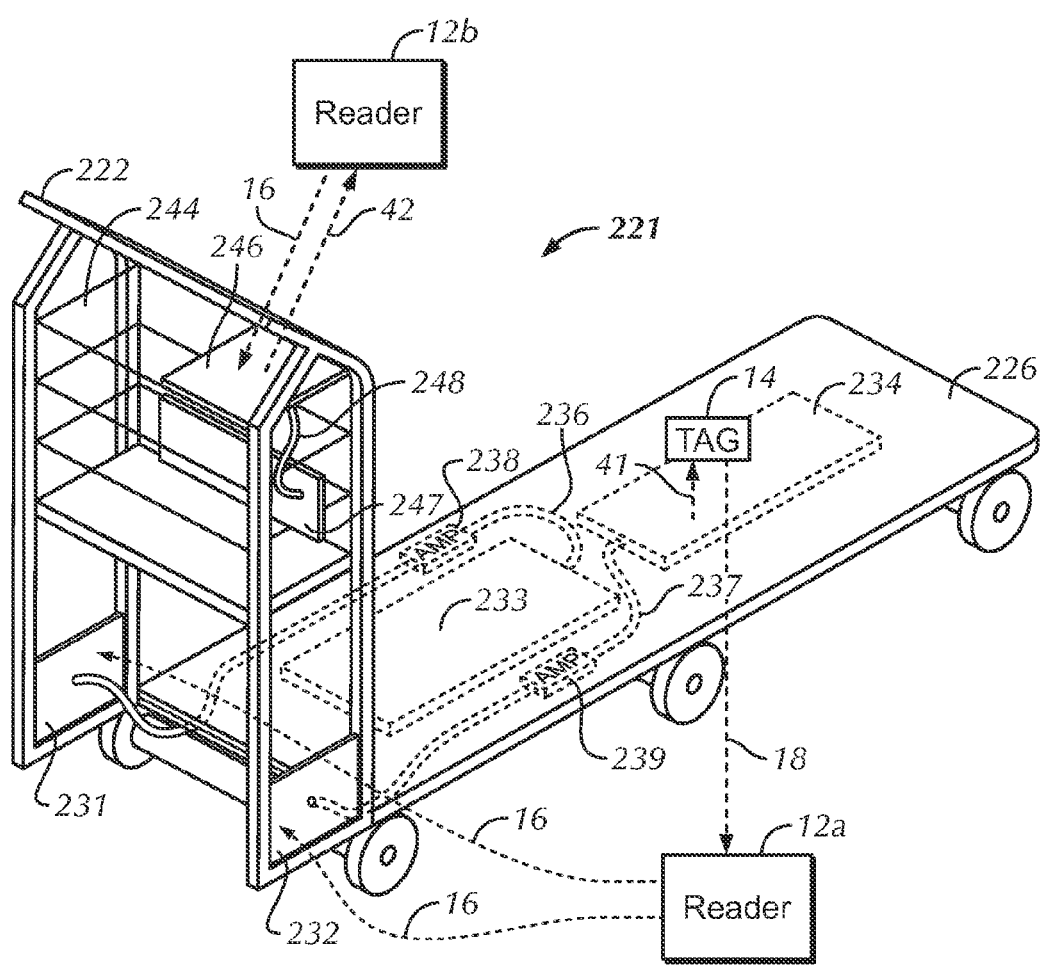
FIG. 10 is a diagrammatic perspective view of an apparatus that includes a shopping cart having a configuration different from that of the shopping cart of FIG. 9 according to one embodiment.

FIG. 10 is a diagrammatic perspective view of an apparatus 221 that includes a shopping cart 222 having a configuration different from that of the shopping cart 202 of FIG. 9. A plastic sheet or panel 226 (e.g., similar to panel 206) is supported on an upwardly-facing support surface of the cart 222. Two panel antennas 231 and 232 are supported on a lower portion of the shopping cart 222, each antenna being disposed near a respective one of the two rear wheels of the cart. The antennas 231 and 232 are oriented so as to extend vertically, and so that each extends approximately parallel to the direction of forward travel of the shopping cart. Two further panel antennas 233 and 234 are each embedded at spaced locations within the plastic panel 226, and each extend generally horizontally.

A coaxial cable 236 (or other electrical coupling structure) couples the antenna 231 to the antenna 233, and a further coaxial cable 237 couples the antenna 232 to the antenna 234. A unidirectional, battery operated amplifier 238 is provided in the cable 236, and a unidirectional, battery-operated amplifier 239 is provided in the cable 237. Alternatively, the amplifiers are bidirectional amplifiers. The amplifiers 238 and 239 are optional, and could be omitted. The antenna 231, antenna 233, cable 236 and (optional) amplifier 238 can be used to inventory products on the shopping cart 226 during checkout using a reader 12a located at the checkout location, in a manner equivalent to that described above in association with FIG. 9. Similarly, the antenna 232, antenna 234, cable 237 and (optional) amplifier 239 can be used to inventory products on the shopping cart 226 during checkout using the reader 12a located at the checkout location, or using a second reader (not illustrated) at the checkout location. In the illustrated embodiment including an exemplary tag 14, the response signals 18 have sufficient energy to reach the reader 12a directly without further amplification or rebroadcasting.

The shopping cart 222 has an upper portion that includes a wire mesh basket 244. A horizontal panel antenna 246 is supported on a top portion of the basket 244, and a vertical panel antenna 247 is supported on a front side of the basket 244. A coaxial cable 248 (or other electrically coupling structure) extends between the antennas 246 and 247. The antenna 246, antenna 247 and cable 248 collectively define an intermediate apparatus electrically similar to that shown at 33 in FIG. 2. Alternatively, however, the intermediate apparatus could be configured to be similar to the intermediate apparatus 53 of FIG. 3, the intermediate apparatus 73 of FIG. 4, or the intermediate apparatus 83 of FIG. 5 or other intermediate apparatuses described herein. As a shopper is moving about a store, readers 12*b* mounted on the ceiling of the store can transmit signals to the antenna 246. These signals will be amplified by the antenna 246, will propagate through the cable 248, and will be rebroadcast by the antenna 247 to tags present on products supported on the shopping cart. Signals from the tags will be collected and amplified by the antenna 247, will pass through the cable 248, and then will be rebroadcast to the reader 12*b* by the antenna 246. In one embodiment, since the signal 16 was not amplified, the response 18 is rebroadcast by the antenna 246 as signal 42 to reach the reader 12*b*.

Figure 11:
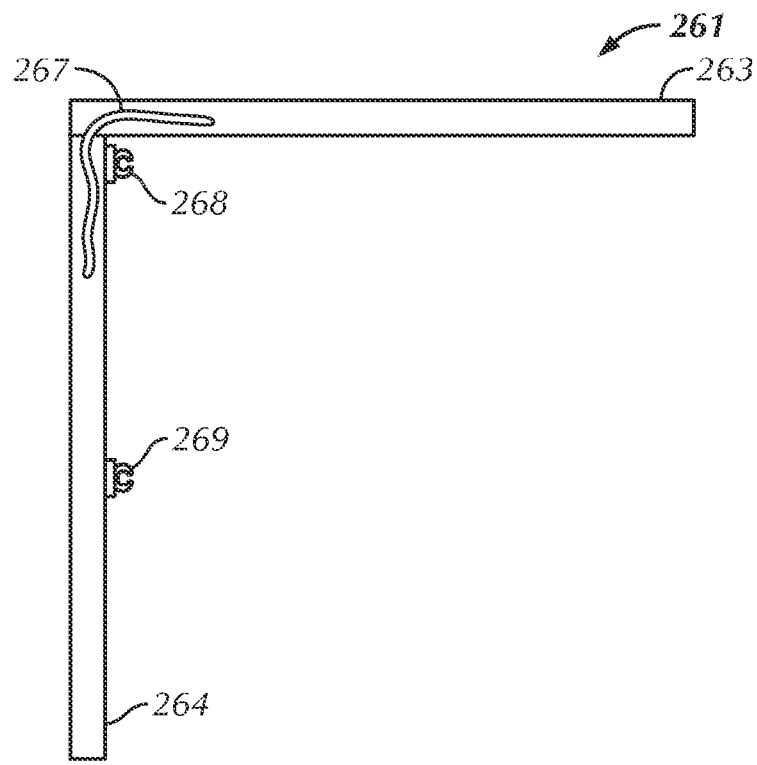
FIG. 11 is a diagrammatic side view of an intermediate apparatus that includes two panel antennas according to one embodiment.

FIG. 11 is a diagrammatic side view of one embodiment of an intermediate apparatus 261 that includes two panel antennas 263 and 264. The antenna 263 extends horizontally, and the antenna 264 extends vertically. The antennas 263 and 264 have adjacent edges that are fixedly coupled to each other. A coaxial cable 267 electrically couples the antenna 263 to the antenna 264. It will be noted that in the illustrated embodiment, the antenna 263, antenna 264 and cable 267 collectively define an intermediate apparatus equivalent to that shown at 33 in FIG. 2. Alternatively, however, the intermediate apparatus could be configured to be similar to the intermediate apparatus 53 of FIG. 3, the intermediate apparatus 73 of FIG. 4, or the intermediate apparatus 83 of FIG. 5 or other intermediate apparatuses described herein. A pair of C-shaped resilient clips 268 and 269 are fixedly supported at vertically-spaced locations on a rear side of the vertical antenna 264.

The intermediate apparatus 261 of FIG. 11 can be removably mounted on a shopping cart or other structure by removably engaging each of the resilient clips 268 and 269 with a respective wire of a wire mesh shopping cart. Thus, for example, the intermediate apparatus 261 of FIG. 11 could be removably mounted on the shopping cart 202 of FIG. 9, or could be substituted for the antenna 246, antenna 247 and cable 248 shown in FIG. 10. Although FIG. 11 shows two clips 268 and 269 that can removably couple the apparatus 261 to a wire mesh shopping cart, it would alternatively be possible to replace the clips 268 and 269 with some other structure that is capable of removably mounting the intermediate apparatus 261 on a shopping cart.

Figure 12:
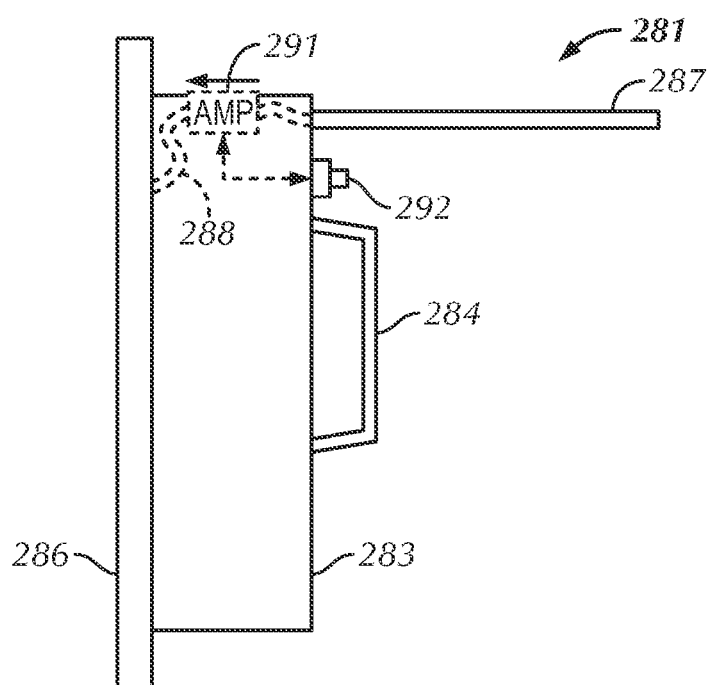
FIG. 12 is a diagrammatic side view of a handheld device having an intermediate apparatus that includes two antennas according to one embodiment.

FIG. 12 is a diagrammatic side view of one embodiment of a handheld device 281 that includes a housing 283 with a handle 284 thereon. The handle 284 can be manually gripped in order to manually support the device 281. The device 281 includes an intermediate apparatus having two antennas 286 and 287. The antenna 287 is an elongate omni-directional antenna that extends approximately horizontally outwardly from the housing 283. The antenna 286 is a panel antenna that is supported on the housing 283 so as to extend approximately vertically. In some embodiments, the antenna 286 is selected to a near field only antenna. The antennas 286 and 287 are electrically coupled by a coaxial cable 288, and a battery-operated inline amplifier 291 is provided in the cable 288. A manually-operable pushbutton switch 292 is provided on the exterior of the housing near the handle 284, and is electrically coupled to the amplifier 291. The switch 292 turns the amplifier 291 on and off. In the embodiment of FIG. 12, the switch is a toggle switch that alternately opens and closes in response to successive manual operations of the pushbutton. Alternatively, however, the switch could be a momentary pushbutton switch that is normally open but that closes for so long as the pushbutton is manually pressed. In one embodiment, intermediate apparatus of FIG. 12 functions as the intermediate apparatus of FIG. 4; however, if no amplifier is used, the intermediate apparatus would be similar to that of FIG. 2.

As one example of a possible use for the device 281, assume there is a garment rack similar to that shown at 102 in FIG. 6, except that the antennas 36 and 109 of FIG. 2 are not present on the garment rack. A number of garments 106 are supported by hangars on the garment rack, each garment having a respective tag 14 thereon. The handheld device 281 can be manually supported near the garment rack in a manner so that the outer surface of the panel antenna faces the garment rack. The pushbutton 292 is manually pressed in order to turn on the amplifier 291. The ceiling-mounted reader 12 (FIG. 2) transmits wireless signals that are collected and amplified by the antenna 287, that propagate through the cable 288, that are further amplified by the amplifier 291, and that are then rebroadcast toward the tags on the garment rack by the panel antenna 286. The tags on the garments would receive the wireless signals rebroadcast by the antenna 286, and would then produce wireless signals that are strong enough to travel directly to the reader 12.

Figure 17:
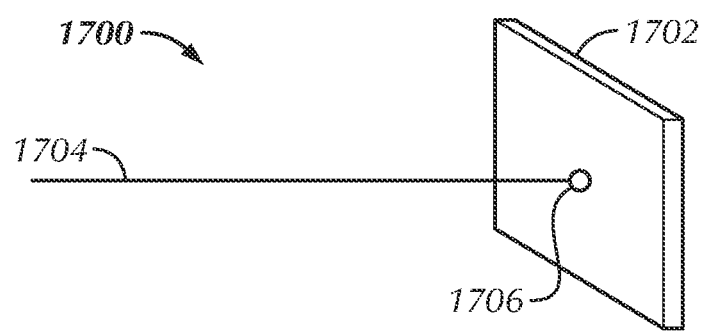
FIG. 17 is a diagrammatic view of an intermediate apparatus for use in an RFID apparatus according to one embodiment.

Referring to FIG. 17, a diagrammatic view is shown of one embodiment of an intermediate apparatus 1700 for use in an RFID device according to one embodiment. The intermediate apparatus 1700 includes panel antenna 1702 that is oriented to communicate with a reader (not shown), and a wire antenna 1704 oriented to communicate with a tag (not shown). For example, antenna 1702 is one embodiment of antenna 36, and antenna 1704 is one embodiment of antenna 37. Antennas 1702 and 1704 are electrically coupled together by a conductive connector 1706. The connector 1706 may be implemented in a variety of forms, such as a simple connector, a coaxial connector, a welding material, and so on. In any event, the connector 1706 is a structure that functions to electrically couple the antennas 1702 and 1704 together. The intermediate apparatus 1700 functions similar at least to the embodiment of FIG. 2. That is, a wireless signal from a reader impinges on the antenna 1702, is amplified by the inherent gain of the antenna 1702, then travels through the connector 1706, and then is rebroadcast by the antenna 1704, for travel to a tag. Similarly, the wireless signal back from the tag impinges on the antenna 1704, is amplified by the inherent gain of the antenna 1704, travels through the connector 1706, and then is rebroadcast by the antenna 1702, for travel to the reader.

It is noted that in some of the embodiments described herein, the antenna arrangement of this and other figures can be reversed and operate in the same way. For example, referring to the embodiment of FIG. 2, the reader 12 and tag 14 can be switched such that the reader 12 is located to communicate with the antenna 37 and the tag 14 is located to communicate with the tag 14.

In several embodiments, one or more of the intermediate structures described herein are designed to be mobile or positionable relative to the reader 12 and/or the tags. For example, the reader 12 and the tag 14 may be located at a distance or relationship relative to each other such that direct communication therebetween will not occur, i.e., the reader 12 can not read the tag 14. One can enable the reader to be able to read the tag by positioning an intermediate apparatus at a location and/or orientation that the reader with communicate with the intermediate apparatus and, which serves as a repeater for the signals between the reader and the tag. By selectively positioning the intermediate apparatus, the user can allow the tag to be read or not.

It is further noted that in some embodiments, the addition of an intermediate apparatus can result in the need for fewer readers to read all of the desired tags. This is due to the increased range of each reader as a result of using an intermediate apparatus, as well as the increased flexibility in allowing one reader to switch between a plurality of antennas. Additionally, in several embodiments, the intermediate apparatuses described herein function as repeaters and can increase the range of communication between the tag and a reader. In some embodiments, this range of communication may be up to 100 feet or more.

Figure 18:
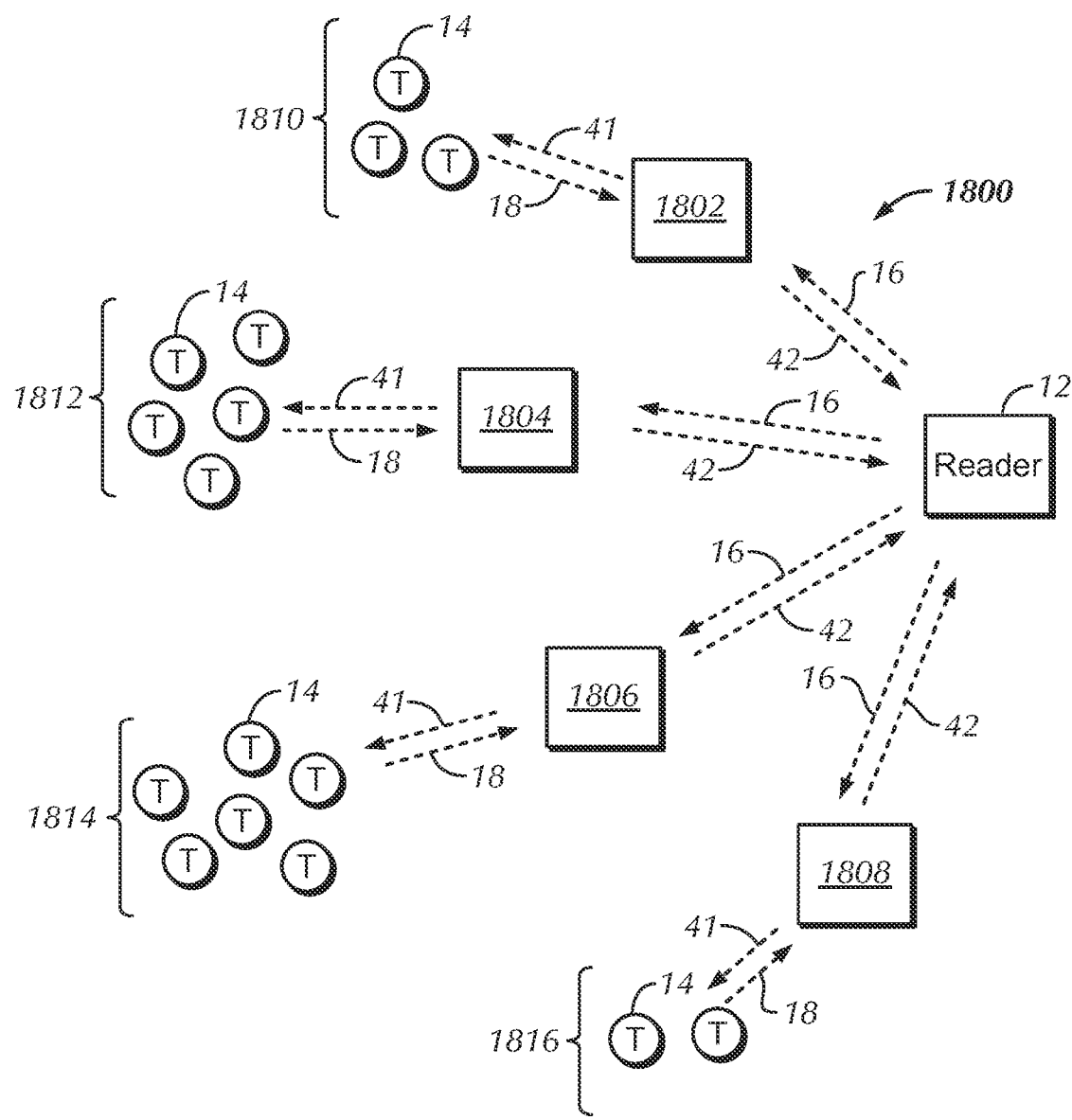
FIG. 18 is a diagrammatic view of an RFID system including multiple intermediate apparatuses each communicating to a respective group of RFID tags according to one embodiment.

Referring next to FIG. 18, a diagrammatic view is shown of an RFID system 1800 including multiple intermediate apparatuses 1802, 1804, 1806 and 1808 each communicating to one of multiple groups 1810, 1812, 1814 and 1816 of RFID tags 14 according to one embodiment. This embodiment is a more generic version of the system of the embodiment illustrated in FIG. 8 and is based on intermediate apparatuses like that shown in FIG. 2 which does not include amplifiers. In this embodiment, the reader 12 transmits signals 16 which may be received by one or more of the intermediate apparatuses 1802, 1804, 1806 and 1808. In one embodiment, a switching mechanism (e.g., an RF tag 161 and relay 171 or other circuitry) is employed at each intermediate apparatus to indicate which of the intermediate apparatuses is to rebroadcast the signal 41. In one embodiment, only one of the intermediate apparatuses is activated at the same time. In other embodiments, multiple intermediate apparatuses are activated at the same time. The intermediate apparatuses 1802, 1804, 1806 and 1808 can be implemented as variously described herein. It is apparent from FIG. 18 that through the use of multiple intermediate apparatuses, several groups of tags can be read by one reader and at a greater range that a reader would normally be able to read without the aid of the intermediate apparatuses. In an alternate embodiment, a single mobile intermediate apparatus is used instead of multiple fixed location intermediate apparatuses and is sequentially moved and positioned at the locations of the illustrated intermediate apparatuses 1802, 1804, 1806, 1808 to sequentially allow the reader 12 to read each of the groups 1810, 1812, 1814, 1816. As this mobile intermediate apparatus is moved to a given location, the reader can read the tags of the given group.

Figure 19:
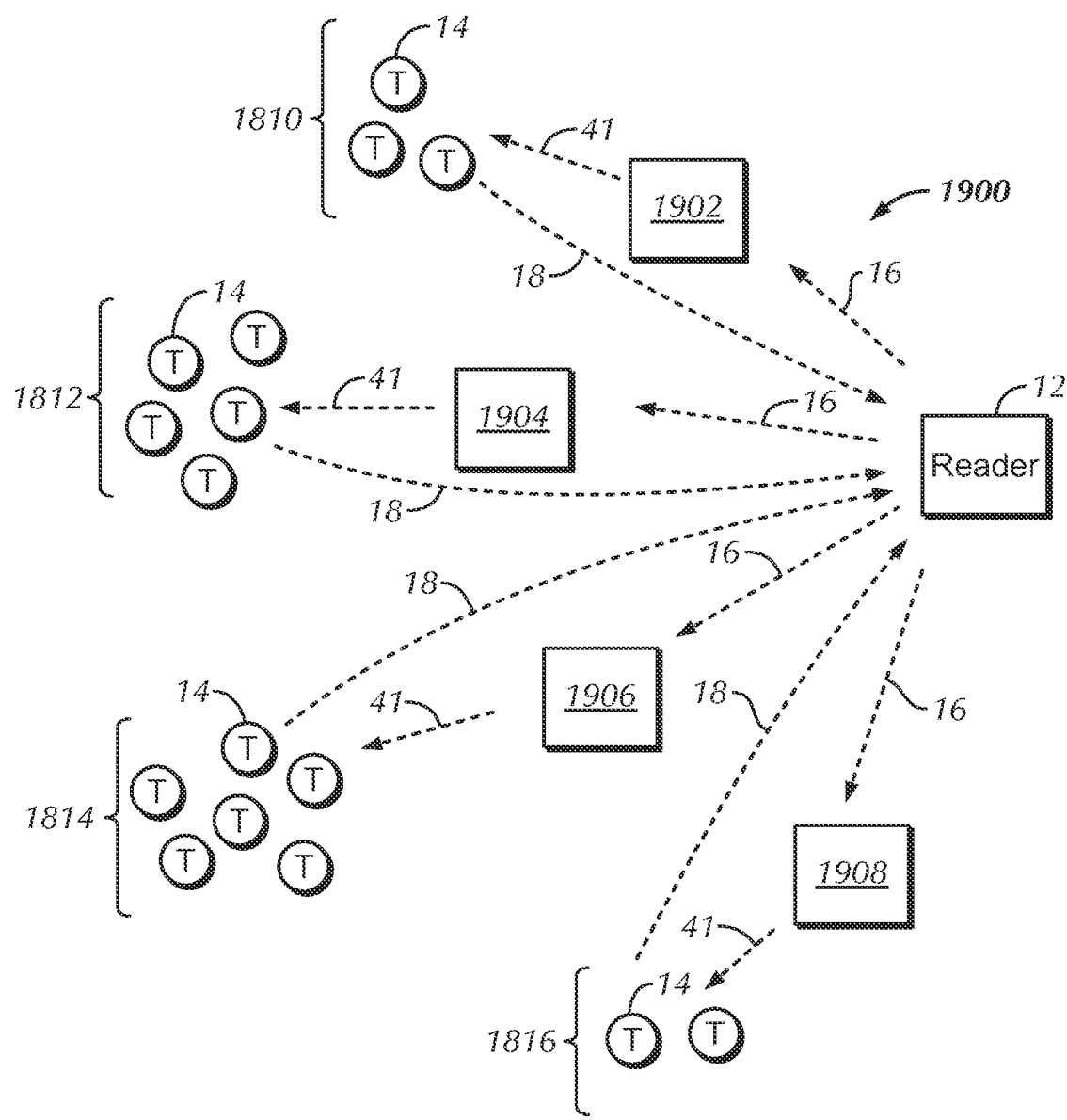
FIG. 19 is a diagrammatic view of a variation of the RFID system of FIG. 18 according to one embodiment.

Referring next to FIG. 19, a diagrammatic view is shown of an RFID system 1900 that is a variation of the RFID system 1800 of FIG. 18 according to one embodiment. In this embodiment, intermediate apparatuses 1902, 1904, 1906 and 1908 are similar to that shown in FIG. 4 in which the signals 16 are amplified (amplifier not shown) in the reader to tag direction. Accordingly, in this embodiment, the response signals 18 have sufficient energy to directly reach the reader 12 without requiring further amplification or rebroadcasting by the intermediate apparatuses 1902, 1904, 1906 and 1908. It is noted that in some cases, the response signals 18 may require further amplification or rebroadcasting, in which case, the intermediate apparatuses are similar to that of FIG. 3.

Figure 20:
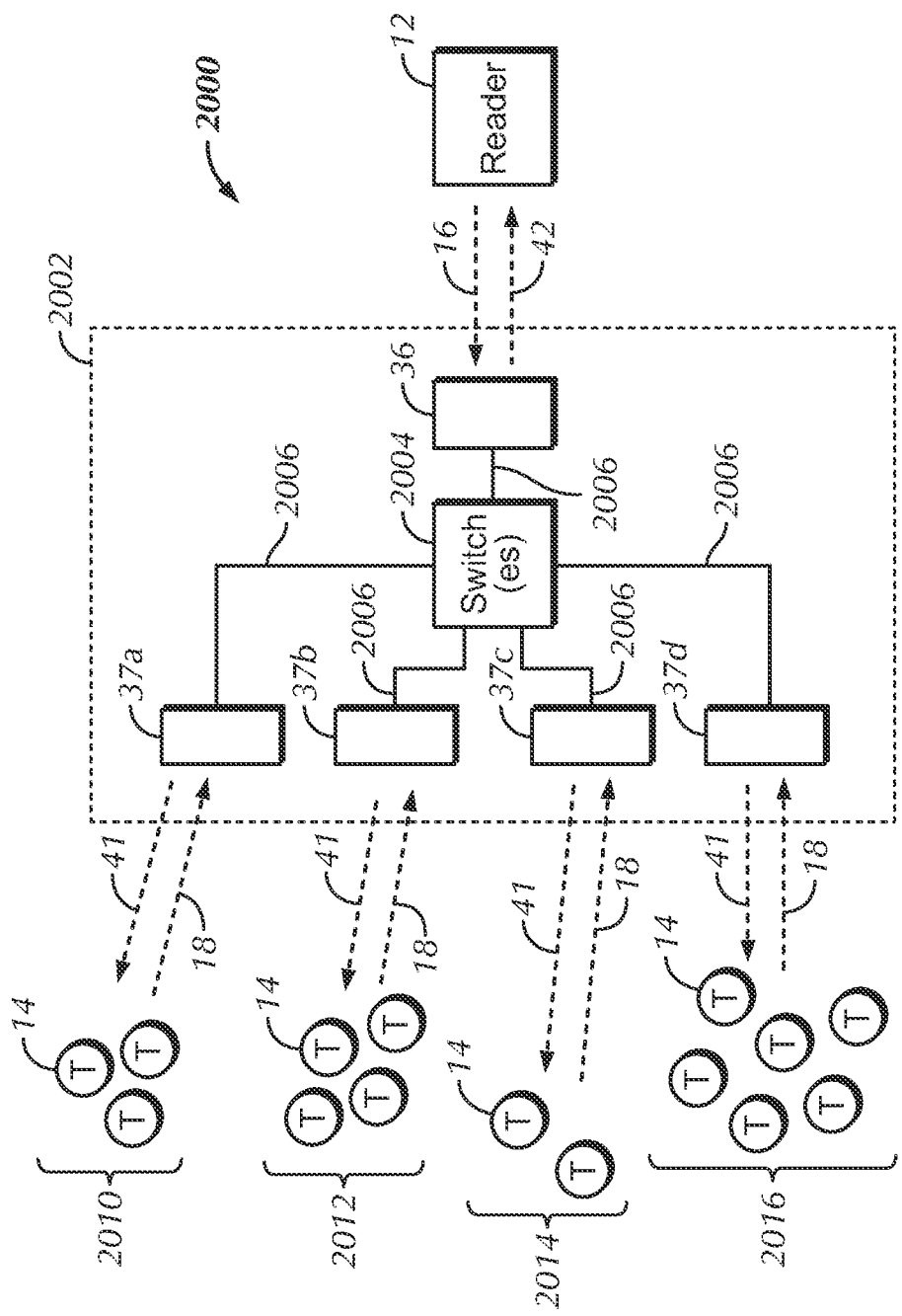
FIG. 20 is a diagrammatic view of an RFID system including an intermediate apparatus that selectively switches between different groups of RFID tags according to another embodiment.

Referring next to FIG. 20, a diagrammatic view is shown of an RFID system 2000 including an intermediate apparatus 2002 that selectively switches between different groups 2010, 2012, 2014 and 2016 of RFID tags 14 according to another embodiment. This embodiment is similar to the embodiment illustrated in FIG. 13. In this embodiment, the reader 12 transmits signals 16 which are collected by the antenna 36 of the intermediate apparatus 2002. The signals are selectively split or switched to one or more of multiple antennas 37a, 37b, 37c and 37d using one or more switches 2004 (the one or more switches may be generically referred to as a switching mechanism). As described herein, coupling structure 2006 electrically couples each of the antennas 37a, 37b, 37c and 37d to the antenna 36 via the one or more switches 2004. The one or more switches 2004 control how the signals 16 are switched, routed, multiplexed or split among the different antennas 37. In one embodiment, only one of the antennas 37 is activated at the same time. In other embodiments, multiple antennas 37 are activated at the same time. The intermediate apparatus 2002 can be implemented as variously described herein, for example, including one or more of an amplifier, a relay, an RF tag, an on/off switch. It is apparent from FIG. 20 that through the use of multiple tag-side antennas 37a, 37b, 37c and 37d, several groups of tags can be read by one reader 12 and at a greater range that a reader would normally be able to read without the aid of the intermediate apparatus 2002.

Figure 21:
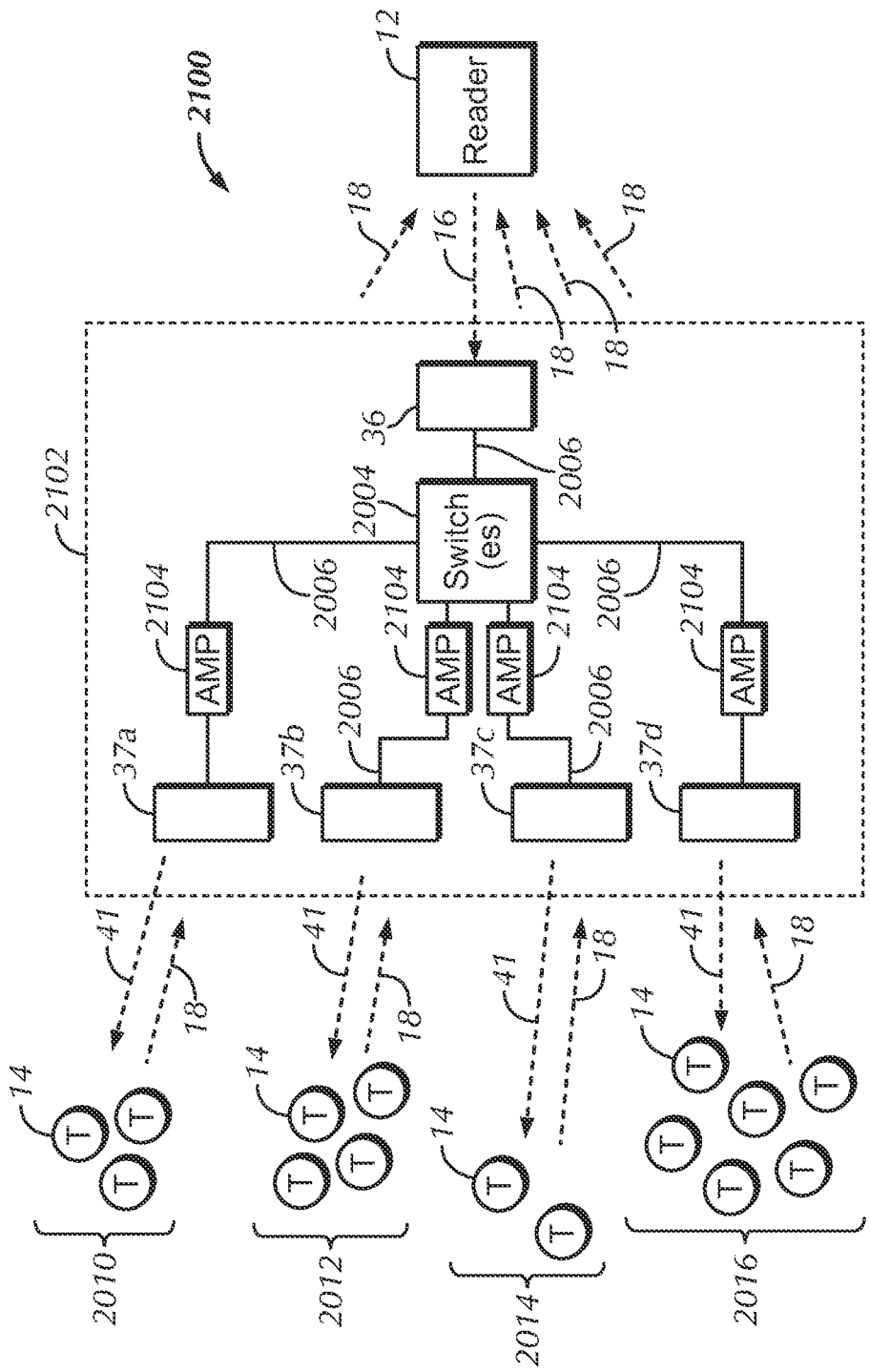
FIG. 21 is a diagrammatic view of a variation of the RFID system of FIG. 20 according to another embodiment.

Referring next to FIG. 21, a diagrammatic view is shown of an RFID system 2100 which is a variation of the RFID system 2000 of FIG. 20 according to another embodiment. In this embodiment, the intermediate apparatus 2102 is similar to that of FIG. 4 in which unidirectional inline amplifiers 2104 are used to amplify the signal 16 after switching and before rebroadcasting. Alternatively, one unidirectional inline amplifier 2104 could be positioned between antenna 36 and the one or more switches 2004. In this embodiment, the response signals 18 have sufficient energy to directly reach the reader 12 without requiring further amplification or rebroadcasting by the intermediate apparatus 2102. For clarity, the signals 18 are not illustrated as continuously extending from the groups to the reader 12. It is noted that in some cases, the response signals 18 may require further amplification or rebroadcasting, in which case, the intermediate apparatus 2102 would be similar to that of FIG. 3 including additional unidirectional amplifiers or amplifiers 2006 being bidirectional.

Figure 22:
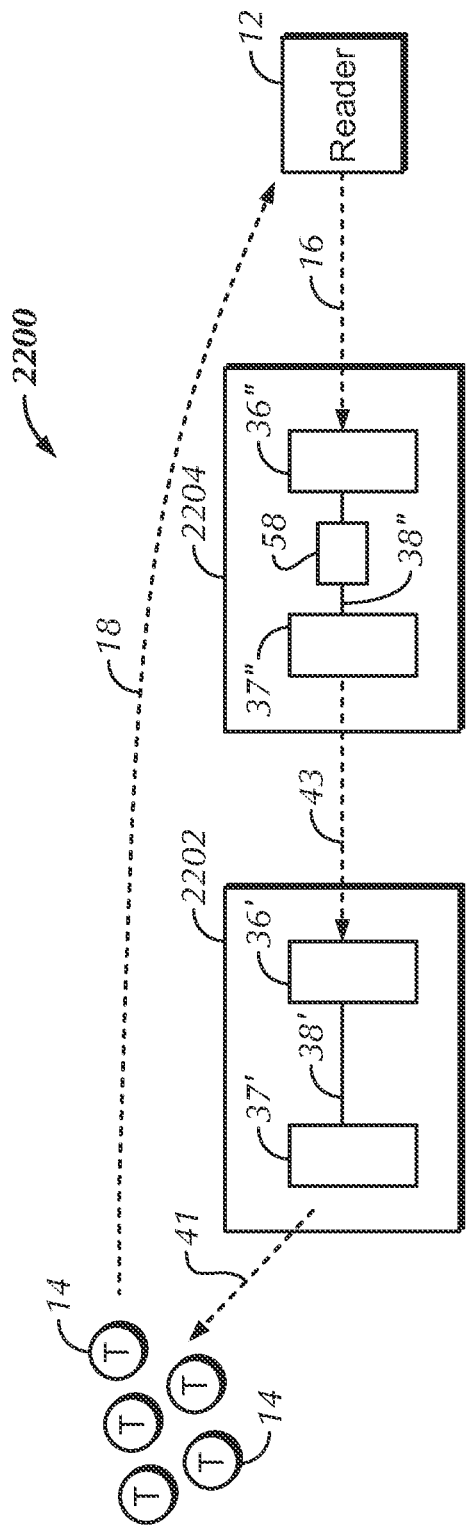
FIG. 22 is a diagrammatic view of an RFID system in which multiple intermediate apparatuses communicate serially in accordance with another embodiment.

Referring next to FIG. 22, a diagrammatic view of an RFID system 2200 is shown in which multiple intermediate apparatuses 2202 and 2204 communicate serially with each other in accordance with another embodiment. In this embodiment, intermediate apparatus 2202 (also referred to as an RFID repeater or a reader repeater) is similar to that of FIG. 2, whereas intermediate apparatus 2204 (also referred to as an RFID repeater or a reader repeater) is similar to that of FIG. 4. In this embodiment, the intermediate apparatuses 2202 and 2204 can also be referred to as RFID repeaters or reader repeaters.

In operation, the signal 16 from the reader 12 reaches antenna 36" and is directed by cable 38" to antenna 37" via amplifier 58. The signal is amplified by the amplifier 58 and is then rebroadcasted in amplified form as signal 43 to the intermediate apparatus 2202. The signal 43 is received at antenna 36' and coupled to antenna 37' by cable 38'. It is noted that cables 38' and 38" may be generically referred to as structure to electrically couple the respective antennas together. Antenna 37' rebroadcasts the signal as signal 41 directed toward the one or more tags 14. Accordingly, the antennas are selected and oriented to allow the illustrated communications. That is, antenna 36" is selected and oriented to communicate with the reader 14, and antenna 37" is selected and oriented to communicate with the antenna 36'. Likewise, antenna 36' is selected and oriented to communicate with the antenna 37", and antenna 37' is selected and oriented to communicate with the one or more tags 14. In one embodiment, the intermediate apparatuses 2202 and 2204 are electrically separate from each other. In an alternative embodiment, the signal 43 can be electrically and removably coupled by a wireline connection direct to the intermediate apparatus 2202. In such alternative embodiment, antenna 36' and antenna 37" are not required; thus, the output of amplifier 58 at cable 38" would be connected by a removable wireline connection to cable 38'.

Similar to that described herein, the tags transmit response signals 18, which in the illustrated embodiment, due to the amplification, have sufficient energy to reach the reader 12 without further amplification or rebroadcasting.

In accordance with some embodiments, it is possible to serially and communicationally couple more than one intermediate apparatus together. In the illustrated embodiment, two are serially communicationally coupled together; however, in other embodiments, there may be three or more serially and communicationally coupled together. In one embodiment, this configuration allows for the intermediate apparatuses 2202 and 2204 to be designed differently. For example, one can be a low cost simple device and the other can be a higher cost more complex device. For example, in one embodiment, intermediate apparatus 2202 may be a simple, low power device with no amplifiers or other devices requiring power. The antennas are generally selected and oriented to communicate in the intended manner in an efficient way depending on the application. For example, antennas 36' and 37" are near field antennas and antennas 37' and 36" are far field antennas; however, it is understood that the antennas may be differently configured in other embodiments. Further, the intermediate apparatus 2204 is a more complex device where antenna 37" is near field and antenna 36" is far field and includes the amplifier 58. Thus, the intermediate apparatus 2204 be more costly and would require battery power and require maintenance (battery replacement).

Figure 23:
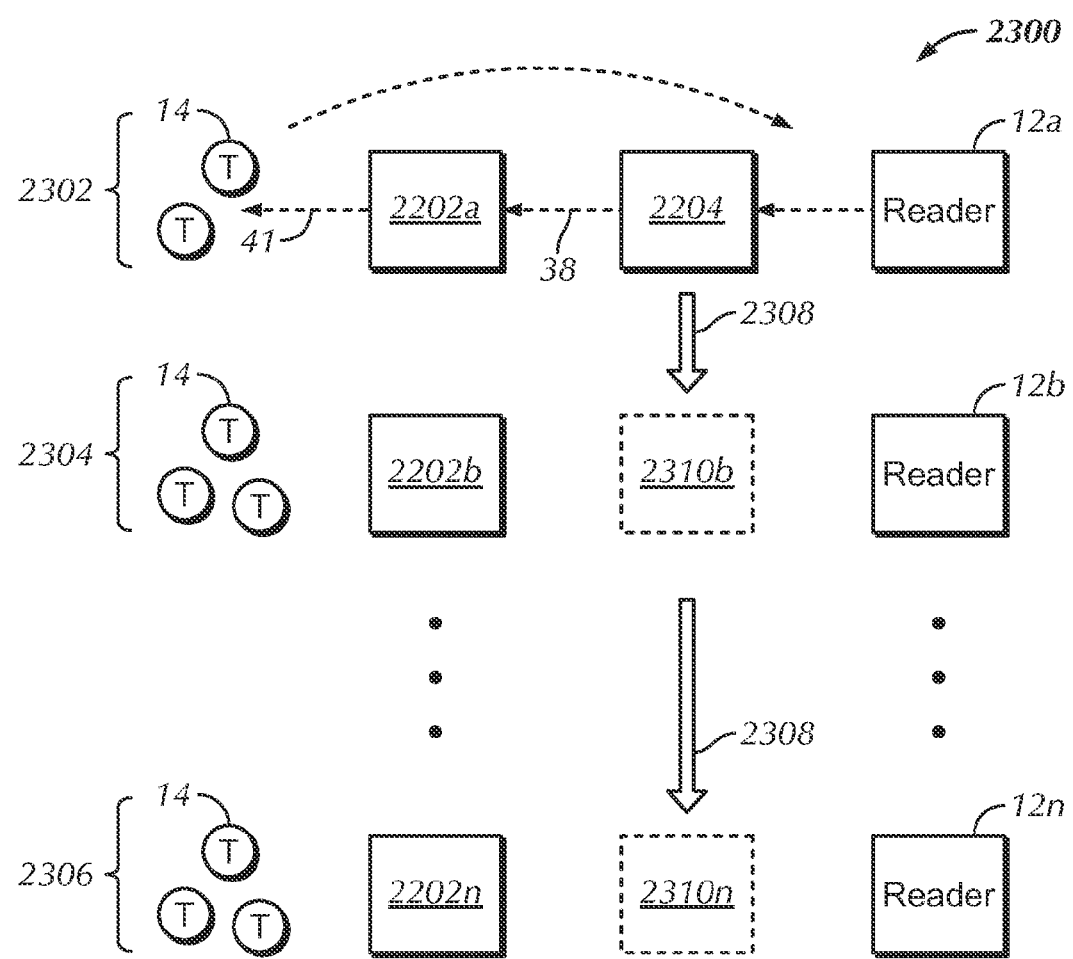
FIG. 23 is a diagrammatic view of one implementation of an RFID system including multiple RFID systems of FIG. 22 in accordance with another embodiment.

In one practical implementation of such design illustrated in FIG. 23, an RFID system 2300 is shown that includes multiple effective RFID systems like that of FIG. 22 in accordance with another embodiment. The intermediate apparatus 2204 is mobile (e.g., it could be embodied as the device 281 of FIG. 12) and is selectively positioned by a user or automated assembly to be in proximity to different ones of tens or hundreds of intermediate apparatuses (shown as intermediate apparatuses 2202a through 2202n). When the mobile intermediate apparatus 2204 is oriented to communicate with a particular intermediate apparatus 2202 (e.g., intermediate apparatus 2202a of FIG. 23), it will enable the reader 12a to read a group 2302 of tags 14 as shown as described above. The mobile intermediate apparatus 2204 could then be repositioned (shown by arrow 2308) proximate a next intermediate apparatus 2202b (shown at location 2310b) to enable a different reader 12b to read a different group 2304 of tags. Likewise, the mobile intermediate apparatus 2204 can be moved to the next location 2310n to enable the reader 12n to read another group 2306 of tags. In this way, the intermediate apparatuses 2202a-2202n that will be implemented as many devices in a system will be the simple inexpensive components of the system that do not require power or maintenance. On the other hand, the intermediate apparatus 2204 that is fewer in number in the system will be the more expensive and more complex device that requires power and maintenance. It is noted that in other embodiments, the intermediate apparatuses of FIGS. 22 and 23 may be altered with additional amplifiers if needed (such as that of FIG. 3) or additional switching or splitting devices may be included. It is further noted that by selectively positioning the intermediate apparatus 2204 proximate to and to communicate with intermediate apparatus 2202, the intermediate apparatus 2202 functioning like that of FIG. 2 is dynamically converted to an intermediate apparatus that functions like that of FIG. 4.

Figure 24:
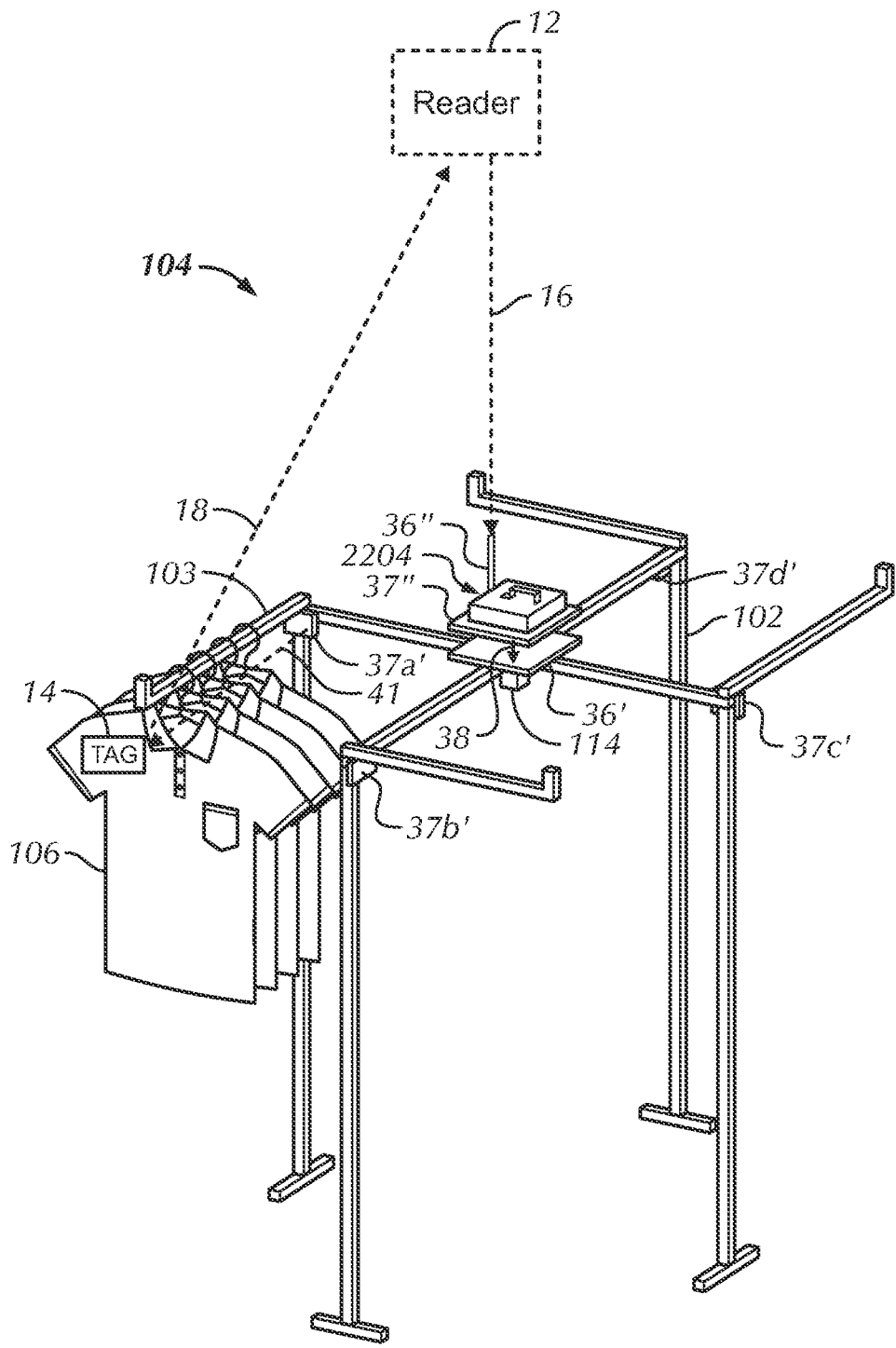
FIG. 24 is a diagrammatic perspective view of a garment rack that is a further embodiment of the garment rack of FIG. 16 operating similar to the systems of FIGS. 22 and 23 in accordance with one embodiment.

FIG. 24 is a diagrammatic perspective view of a garment rack 102 (which may generically be referred to as a merchandizing unit) that is a further embodiment of the garment rack of FIG. 16 operating similar to the system of FIGS. 22 and 23 in accordance with one embodiment. In this embodiment, garment rack 102 includes an intermediate apparatus 2202 (reference number 2202 is not shown in FIG. 24) that includes antenna 36', splitter or switching device 114 and antennas 37a', 37b', 37c' and 37d' coupled to the switching device 114. The intermediate apparatus 2202 is similar to the intermediate apparatus 2102 of FIG. 21. In operation, the intermediate apparatus 2204 is set on top of or positioned and oriented relative to the antenna 36' so that the antenna 37" can communicate with antenna 36'. In the illustrated embodiment, the intermediate apparatus 2204 is similar to the device of FIG. 12. When the intermediate apparatus 2204 is positioned as illustrated, the reader 12 is now enabled to read the tags 14 of the garment rack 102. For example, the signal 16 is received by antenna 36", amplified and rebroadcast by antenna 37" as signal 38. Signal 38 is received at antenna 36' and selectively coupled to one or more of the antennas 37a', 37b', 37c' and 37d' using the switching device 114. As illustrated, the signal is then rebroadcast by antenna 37a' as signal 41 to the tag 14. The response signal 18 has enough energy to reach the reader 12 directly without further amplification or rebroadcasting. Once read, a user can remove intermediate apparatus 2204 and relocate it to the next merchandizing unit or group of tags and reader. In this embodiment, the intermediate apparatuses implemented at garment racks or other merchandizing units are simple and inexpensive, making them practical to implement in a large scale setting. The intermediate apparatus 2204 is more complex, but is far fewer in number. One intermediate apparatus 2204 could enable tens or hundreds of RFID systems by being positioned proximate to a given intermediate apparatus 2202. It is noted that this system could be varied such as described in FIGS. 22 and 23 or elsewhere in the specification. It is noted that in several embodiments, due to the insulating material (e.g., plastic) of the antenna housings or coverings (antennas 36' and 37" are implemented within respective housings or are covered), the handheld intermediate apparatus 2204 can be set directly on top of the antenna 36' such that antenna 37" and antenna 36' are not electrically coupled together and do not contact each other.

Figure 25:
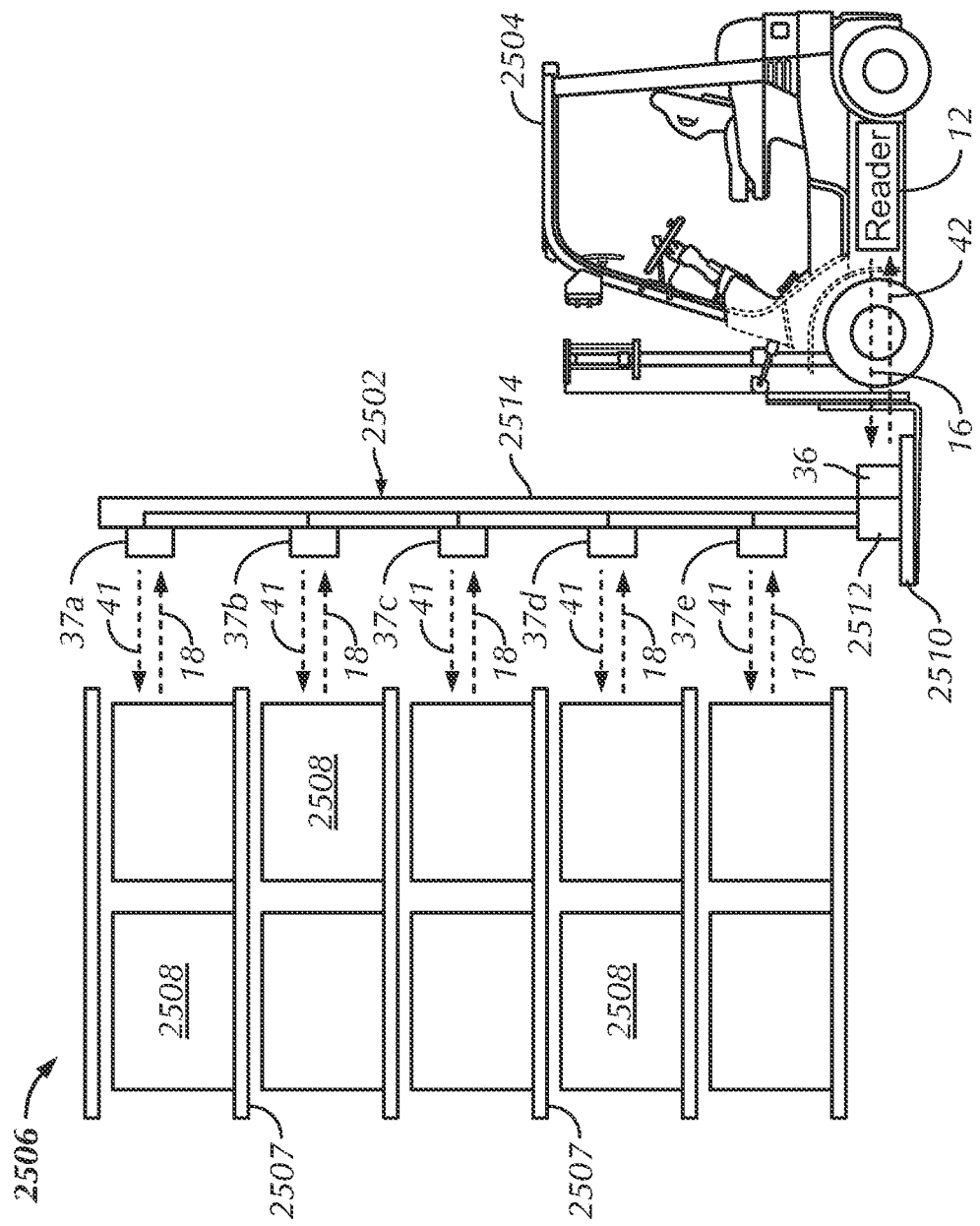
FIG. 25 is a diagrammatic view of an apparatus for use in an inventory warehouse in which a mobile reader and mobile intermediate apparatus are used to selectively read tags at various fixed locations in accordance with one embodiment.

Referring next to FIG. 25, a diagrammatic view is shown of an apparatus for use in an inventory warehouse in which a mobile reader 12 and mobile intermediate apparatus 2502 are used to selectively read tags at various fixed locations in accordance with one embodiment. In this implementation, the mobile reader 12 is integrated with or part of a forklift 2504 or other mobile vehicle that can navigate through the inventory space. It is increasingly common for forklifts and other mobile devices in inventory warehouses to include a reader; thus, the forklift 2504 is entirely conventional. A separate intermediate apparatus 2502 is provided in the form of an elongate member or pole extending a desired height. In this case, the height corresponds to the height of inventory shelving unit 2506 having shelves 2507 designed to hold inventory units 2508 (e.g., crates or cartons) having tags (not shown) imbedded therein or applied thereon.

The intermediate apparatus 2502 includes a base 2510 having an antenna 36 and one or more switches 2512 (e.g., similar to switches 2004) attached to the base 2510. Also included is an elongate member 2514 (e.g., a pole) having multiple antennas 37a, 37b, 37c, 37d, 37e spaced at intervals along the height of the member 2514. Each of the antennas 37a-37e and antenna 36 are coupled by wireline extending through the member 2514 (e.g., the member is hollow) to the one or more switches 2512.

In operation, the system functions similar to the embodiment of FIG. 20. For example, the operator picks up the intermediate apparatus 2502 using the forklift 2504 and drives through the inventory space adjacent the shelving unit 2506. As the intermediate apparatus 2502 approaches different portions of the shelving unit 2506, the reader will be able to read different tags to inventory the units 2508. For example, the reader 12 transmits signal 16, which is received by antenna 36 of the intermediate apparatus 2502. The signal is then selectively switched (by the one or more switches 2512) to one or more of the antennas 37a-37e. In one embodiment, the one or more switches 2514 rapidly switch the received signal 16 sequentially to the antennas 37a-37e in order. Each antenna 37a-37e rebroadcasts signal 41, which is reflected by the tags in range as response signals 18. The response signals 18 are routed by the wiring to the one or more switches 2514 to the antenna 36. Antenna transmits the signal 42 back to the reader 12. As the forklift is moved through the inventory space, the reader automatically reads any tags at the various heights throughout the space. Reader data is saved by the reader or by a computer device (not shown) or by a memory device (not shown) to be transported to a computer device. By knowing the height of each antenna 37a-37e, the computer device can inventory which tags (i.e., which units 2508) are where in the warehouse. In some embodiments, the intermediate apparatus 2502 does not require power or regular maintenance and can be a simple, inexpensive device. When done, the user can use to the forklift to set the intermediate apparatus 2502 to a storage location for later use. The intermediate apparatus 2502 functions as intended when it is positioned and oriented such that antenna 36 communicates with the reader 12. In other embodiments, amplification may be needed; thus, the intermediate apparatus 2502 may be modified to include an amplifier, which in most cases, will result in the return signals 18 traveling directly to the reader 12 without rebroadcasting. In other embodiments, the intermediate apparatus 2502 may be modified to include one or more features of other embodiments disclosed herein.

Figure 26:
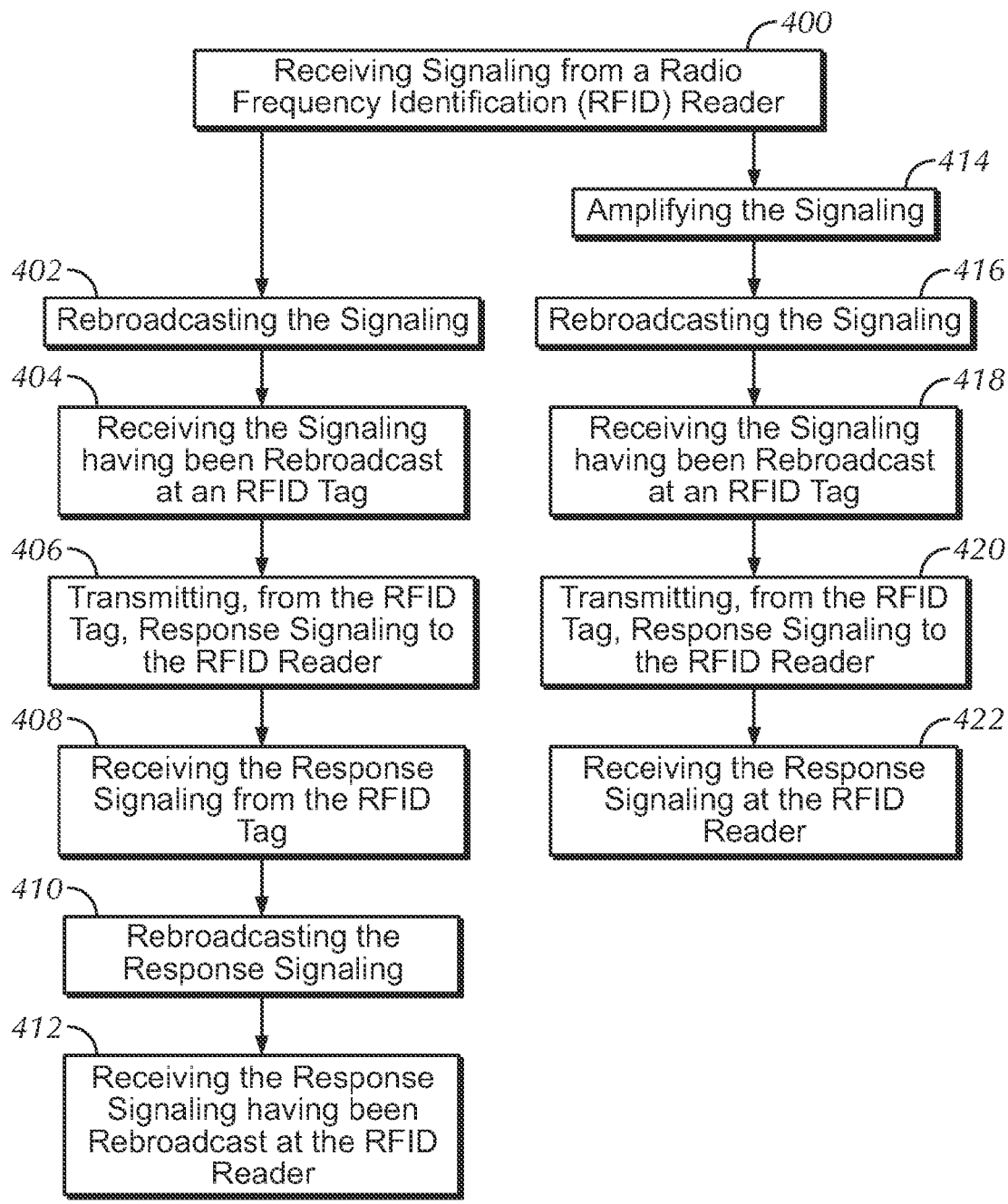
FIG. 26 is a flowchart illustrating the steps performed in accordance with several embodiments of the invention.

Referring next to FIG. 26, a flowchart is shown that illustrates the steps performed in accordance with several embodiments of the invention. The method may be performed by one or more of the RFID apparatuses and intermediate apparatuses described herein, as well as by other structures and apparatuses not specifically described herein.

Initially, wireless signaling is received from an RFID reader (Step 400). The signaling is often existing reader signaling collected using an antenna (e.g., antenna 36) of an intermediate apparatus, such as those described herein. Next, the steps follow one of two paths depending on whether amplification is needed. In one embodiment, amplification is not needed, and the next step is that the signaling is rebroadcast (Step 402). In one form, the received signaling is electrically coupled to a second antenna (e.g., antenna 37) and rebroadcast.

Next, the rebroadcast signaling is received at an RFID tag (Step 404). At this point, due to the rebroadcasting of the signal transmitted from the reader, the signal is able to reach the RFID tag when it otherwise would not have been able to. Next, the RFID tag transmits response signaling intended for the RFID reader (Step 406). The transmitting step will depend on the type of RFID tag. For example, a passive RFID tag will use and reflect some of the received signal to form the transmitted signal, whereas an active tag will actively generate and transmit its own response signaling. In either case, as is well known in RFID systems, the response signaling is modulated with data, e.g., including the unique identification code of that particular tag.

Next, the response signaling is received (Step 408). For example, as described herein, the response signaling is received at an antenna of an intermediate apparatus. Next, the response signaling is rebroadcast (Step 410). For example, antenna 36 rebroadcasts the response signal to the RFID reader. And, finally, the response signaling is received at the RFID reader (Step 412). In one form, this process is similar to that accomplished by the intermediate apparatus of FIG. 2.

In the alternative path of the method of FIG. 26, after step 400, the signal is amplified (Step 414). For example, a battery powered amplifier is used to amplify the received signaling. It is noted that in some embodiments, the antenna receiving the signaling may introduce a gain in the received signal. In some embodiments, the amplifying step is separate from any amplification due to the antenna gain. Next, the signaling is rebroadcast (Step 416). In one form, the received signaling is electrically coupled to a second antenna (e.g., antenna 37) and rebroadcast. Next, the rebroadcast signaling is received at an RFID tag (Step 418). At this point, due to the rebroadcasting of the signal transmitted from the reader, the signal is able to reach the RFID tag when it otherwise would not have been able to. Next, the RFID tag transmits response signaling intended for the RFID reader (Step 420). The transmitting step will depend on the type of RFID tag. For example, a passive RFID tag will use and reflect some of the received signal to form the transmitted signal, whereas an active tag will actively generate and transmit its own response signaling. In either case, as is well known in RFID systems, the response signaling is modulated with data, e.g., including the unique identification code of that particular tag. Next, since the signal as amplified at step 414, the response signal is directly received at the RFID reader (Step 422). In one form, this process is similar to that accomplished by the intermediate apparatus of FIG. 4.

Several embodiments of this method differ from the conventional method of communicating between a reader and tag in that the signaling from one or both of the reader and the tag is repeated or rebroadcast in order to increase communication range without modifying the reader or tags and allowing the use of fewer readers. In some embodiments, the rebroadcasting is configured to transform the rebroadcast signal to have characteristics best suited for a given implementation. In alternative embodiments, the method may be supplemented with additional steps such as those described throughout this specification. For example, switching our routing steps may be performed to trigger rebroadcasting of reader signals to selectable groups of RFID tags.

While the invention herein disclosed has been described by means of specific embodiments, examples and applications thereof, numerous modifications and variations could be made thereto by those skilled in the art without departing from the scope of the invention set forth in the claims.

What is claimed is:

1. An apparatus comprising:
 a first antenna configured to communicate with a radio frequency identification (RFID) reader;
 a second antenna separate from said first antenna, wherein the second antenna comprises a far field antenna configured to communicate in the far field with at least one RFID tag, wherein the at least one RFID tag is not contained within a metal container with respect to the RFID reader; and
 a structure electrically coupling said first and second antennas and including an amplifier coupled to the second antenna and configured to amplify signaling received at the first antenna for transmission from the second antenna to the at least one RFID tag, wherein the signaling transmitted from the second antenna is received by the at least one RFID tag causing a response signal to be transmitted by the at least one RFID tag having sufficient signal strength to reach the RFID reader without passing back through the second antenna and the first antenna.

2. The apparatus of claim 1 wherein the amplifier is unidirectional.

3. The apparatus of claim 1 further comprising a switch coupled to the amplifier and configured to turn on and off the amplifier.

4. The apparatus of claim 1 wherein the amplifier is battery powered.

5. The apparatus of claim 1 wherein one or both of the first antenna and the second antenna are configured to amplify signaling.

6. The apparatus of claim 1 wherein the first antenna has a first antenna configuration and the second antenna has a second antenna configuration, the first antenna configuration different than the second antenna configuration.

7. The apparatus of claim 6 wherein the first and second antenna configurations comprise one of a directional antenna, an omni-directional antenna, a near field antenna, a far field antenna, a circular polarization antenna, a linear polarization antenna, a right-hand polarization antenna and a left-polarization antenna.

8. The apparatus of claim 1 wherein one or more of the first antenna and the second antenna functions as a load bearing member.

9. The apparatus of claim 1 wherein the structure comprises one or more of a wire, an electrically conducting material and a cable.

10. The apparatus of claim 1 further comprising a splitter and a third antenna separate from said first antenna and said second antenna, and configured to communicate with at least one other RFID tag, wherein the structure couples the splitter from the first antenna to the second antenna and couples the first antenna to the third antenna.

11. The apparatus of claim 10 wherein the splitter further comprises a combiner.

12. The apparatus of claim 1 further comprising a switch and a third antenna separate from said first antenna and said second antenna, and configured to communicate with at least one other RFID tag, wherein the structure couples the switch from the first antenna to the second antenna and couples the first antenna to the third antenna.

13. The apparatus of claim 1 further comprising:
a relay, wherein the structure couples the relay between the first antenna and the second antenna; and
a second RFID tag coupled to and controlling the relay, the second RFID tag configured to communicate with the RFID reader.

14. The apparatus of claim 13 wherein the second RFID tag is integrated into a housing containing the relay, the first antenna and the second antenna.

15. The apparatus of claim 1 further comprising:
a relay, wherein the structure couples the relay between the first antenna and the second antenna; and
a control unit coupled to and controlling the relay.

16. The apparatus of claim 15 wherein the control unit includes a timer and is configured to open and close the relay at predetermined times.

17. The apparatus of claim 16 wherein the predetermined times correspond to wake and sleep cycles of the control unit.

18. The apparatus of claim 1 further comprising:
a third antenna configured to communicate with the RFID reader;
a fourth antenna separate from said third antenna, wherein the fourth antenna comprises a far field antenna configured to communicate in the far field with the at least one RFID tag; and a second structure electrically coupling said third and fourth antennas and including another amplifier coupled to the fourth antenna and configured to amplify signaling received at the third antenna for transmission from the fourth antenna to the at least one RFID tag, wherein the signaling transmitted from the fourth antenna is received by the at least one RFID tag causing a response signal to be transmitted by the at least one RFID tag having sufficient signal strength to reach the RFID reader without passing back through the fourth antenna and the third antenna.

19. The apparatus of claim 1 further comprising a shopping cart, wherein the first antenna, the second antenna and the structure are mechanically coupled to the shopping cart.

20. The apparatus of claim 1 further comprising a merchandize display unit, wherein the first antenna, the second antenna and the structure are mechanically coupled to the merchandize display unit.

21. The apparatus of claim 20 wherein the merchandize display unit comprises one or both of a shelving unit or a garment rack.

22. The apparatus of claim 1 further comprising:
a mounting structure mechanically coupled to one of the first antenna and the second antenna, the mounting structure configured to allow for the removable coupling of the first antenna, the second antenna and the structure to an object.

23. The apparatus of claim 1 further comprising:
a housing having a handle, wherein the first antenna, the second antenna and the structure are coupled to the housing.

24. The apparatus of claim 1 wherein the first antenna comprises a far field antenna configured to communicate in the far field with the RFID reader.

25. A radio frequency identification (RFID) system comprising:
a first repeater unit configured to receive signaling from an RFID reader and relay first repeated signaling; and
a second repeater unit configured to receive the first repeated signaling and relay second repeated signaling in the far field to one or more RFID tags;
wherein the first repeater unit comprises:
a first antenna configured to communicate with the RFID reader;
a second antenna separate from said first antenna, and configured to communicate with the second repeater unit;
an amplifier; and
a first structure electrically coupling the amplifier between said first and second antennas; and
wherein the second repeater unit comprises:
a third antenna configured to communicate with the second antenna;
a fourth antenna separate from said third antenna, and configured to communicate in the far field with one or more RFID tags; and
a second structure electrically coupling the third and fourth antennas; and
wherein the first repeated signaling transmitted from the second antenna and relayed as the second repeated signaling transmitted from the fourth antenna is received by the one or more RFID tags causing response signals to be transmitted by the one or more RFID tags having sufficient signal strength to reach the RFID reader without passing back through the second repeater unit and the first repeater unit; and the system further comprises the one or more RFID tags, wherein the one or more RFID tags are not contained within a metal container with respect to the RFID reader.

26. The RFID system of claim 25 wherein the first repeater unit is configured to receive the signaling from the RFID reader in the far field and relay the first repeated signaling.

27. The RFID system of claim 25 wherein the first repeater unit is configured to relay the first repeated signaling in a near field; and wherein the second repeater unit is configured to receive the first repeated signaling in the near field.

28. The RFID system of claim 25 wherein the second structure comprises one or more of a wire, an electrically conducting material and a cable and wherein the second structure does not include any active components between the third antenna and the fourth antenna.

29. A method comprising:
receiving, at a first antenna, signaling from a radio frequency identification (RFID) reader;
coupling and amplifying the signaling from the first antenna to a second antenna using a structure comprising an amplifier and one or more of a wire, an electrically conducting material and a cable;
rebroadcasting, by the second antenna, the signaling in the far field to an RFID tag, wherein the second antenna comprises a far field antenna, wherein the RFID tag is not contained within a metal container with respect to the RFID reader;
receiving the signaling having been rebroadcast at the RFID tag; and
transmitting a response signal from the at least one RFID tag, the response signal having sufficient signal strength to reach the RFID reader without passing back through the second antenna and the first antenna; and
receiving the response signal at the RFID reader without the response signal passing back through the second antenna and the first antenna.

30. The method of claim 29 wherein the rebroadcasting step further comprises transforming the signaling while rebroadcasting the signaling.

31. The method of claim 29 further comprising:
selectively coupling the signaling received from the RFID reader to one or more of the second antenna and a plurality of antennas, wherein the rebroadcasting is performed by the one or more of the second antenna and the plurality of the antennas.

32. The method of claim 29 further comprising:
receiving the signaling at a second RFID tag; and
outputting, from the second RFID tag, a control signal to enable the rebroadcasting step.

33. The method of claim 29 further comprising:
outputting, from a control unit, a control signal to enable the rebroadcasting step.

34. The method of claim 33 wherein the outputting step is performed at predetermined times.

35. The method of claim 34 wherein the predetermined times correspond to wake and sleep cycles of the control unit.

36. The method of claim 29 further comprising:
operating a user control to enable the rebroadcasting step.

37. The method of claim 29 wherein the receiving the signaling from the RFID reader step comprises:
receiving, at the first antenna, the signaling from the RFID reader in the far field, wherein the first antenna comprises a far field antenna.

* * * * *